United States Patent
Sawada et al.

(10) Patent No.: US 12,330,508 B2
(45) Date of Patent: Jun. 17, 2025

(54) CONTROL METHOD FOR ELECTRIC VEHICLE AND CONTROL DEVICE FOR ELECTRIC VEHICLE

(71) Applicant: Nissan Motor Co., Ltd., Yokohama (JP)

(72) Inventors: Akira Sawada, Kanagawa (JP); Takashi Nakajima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/727,600

(22) PCT Filed: Apr. 20, 2022

(86) PCT No.: PCT/JP2022/018304
§ 371 (c)(1),
(2) Date: Jul. 9, 2024

(87) PCT Pub. No.: WO2023/139810
PCT Pub. Date: Jul. 27, 2023

(65) Prior Publication Data
US 2025/0091448 A1    Mar. 20, 2025

(30) Foreign Application Priority Data
Jan. 18, 2022    (JP) .................... 2022-006018

(51) Int. Cl.
*B60L 15/20*    (2006.01)
(52) U.S. Cl.
CPC .......... *B60L 15/20* (2013.01); *B60L 2240/12* (2013.01); *B60L 2240/16* (2013.01); *B60L 2240/26* (2013.01); *B60L 2240/423* (2013.01)

(58) Field of Classification Search
CPC .. B60L 15/20; B60L 2240/12; B60L 2240/16; B60L 2240/26; B60L 2240/423;
(Continued)

(56) References Cited

U.S. PATENT DOCUMENTS

| 4,222,614 A | 9/1980 | Spechko |
| 2002/0190683 A1 | 12/2002 | Karikomi et al. |

(Continued)

FOREIGN PATENT DOCUMENTS

| JP | 2003-009566 A | 1/2003 |
| JP | 2004-64906 A | 2/2004 |

(Continued)

*Primary Examiner* — Behrang Badii
(74) *Attorney, Agent, or Firm* — Young Basile Hanlon & MacFarlane, P.C.

(57) ABSTRACT

An electric vehicle includes a motor as a drive source and a coupling portion coupled to another vehicle, and travels while towing the coupled vehicle, which is the other vehicle coupled to the coupling portion. A control method for such an electric vehicle includes: calculating a basic torque target value representing a torque to be output by the motor based on a vehicle operation; calculating a final torque command value, which is a final command value for the torque, by performing correction processing for reducing a longitudinal vibration component generated in the electric vehicle due to the coupled vehicle being coupled to the coupling portion on the basic torque target value, based on a dynamic characteristic of the coupling portion to which the coupled vehicle is coupled; and controlling the motor based on the final torque command value.

15 Claims, 12 Drawing Sheets

(58) Field of Classification Search
CPC . B60L 2200/28; B60L 2270/145; Y02T 10/72
See application file for complete search history.

(56) References Cited

U.S. PATENT DOCUMENTS

| | | | |
|---|---|---|---|
| 2017/0096134 A1* | 4/2017 | Yoon | B60W 20/13 |
| 2018/0290664 A1* | 10/2018 | Suzuki | B60L 15/20 |
| 2019/0081303 A1* | 3/2019 | Worden | B61L 15/0062 |
| 2020/0290464 A1* | 9/2020 | Oh | B60W 40/13 |
| 2021/0229550 A1* | 7/2021 | Isami | B60L 15/2054 |
| 2022/0097786 A1* | 3/2022 | Heseding | B62D 59/04 |
| 2022/0185121 A1 | 6/2022 | Sawada et al. | |

FOREIGN PATENT DOCUMENTS

| | | |
|---|---|---|
| JP | 2007-110879 A | 4/2007 |
| WO | 2020/194621 A1 | 10/2020 |

* cited by examiner

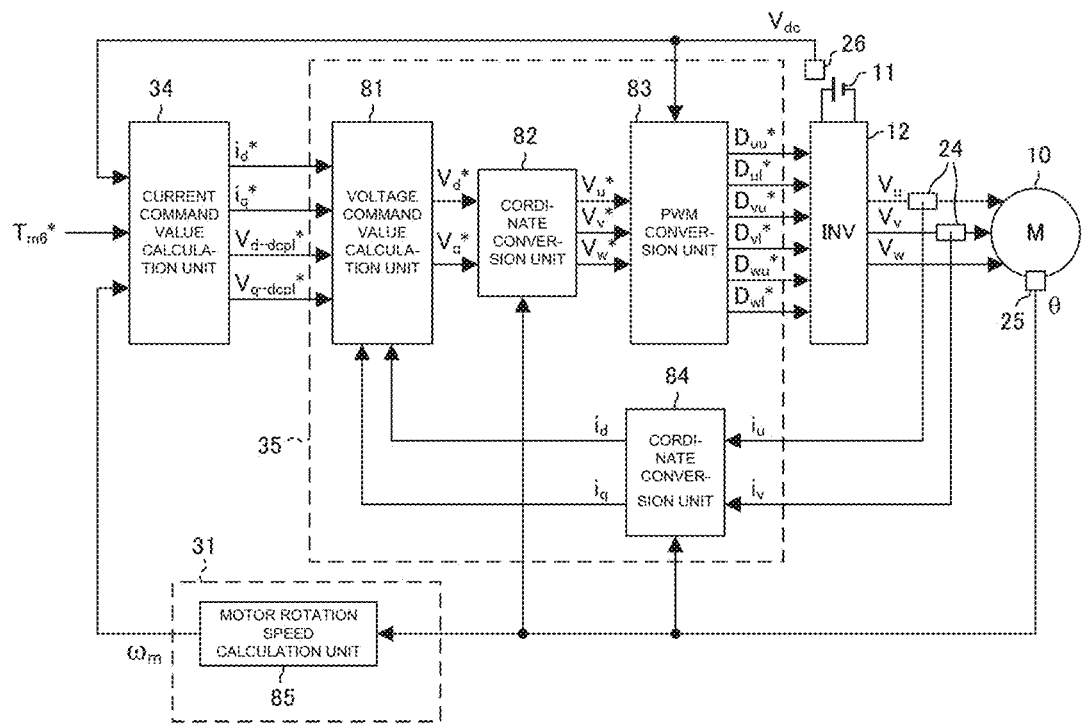
FIG. 11
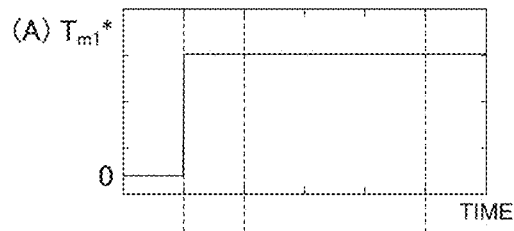
FIG. 12 (A) $T_{m1}^*$
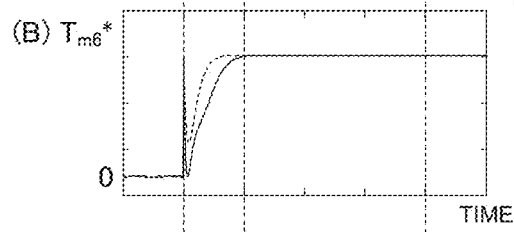
FIG. 12 (B) $T_{m6}^*$
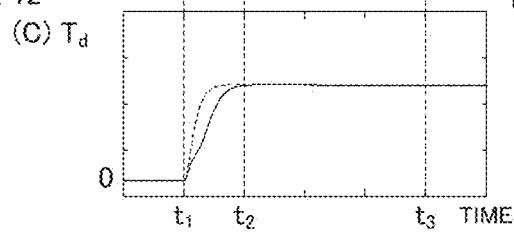
FIG. 12 (C) $T_d$
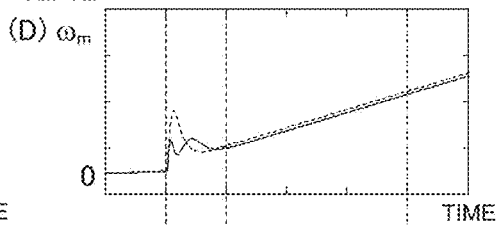
FIG. 12 (D) $\omega_m$
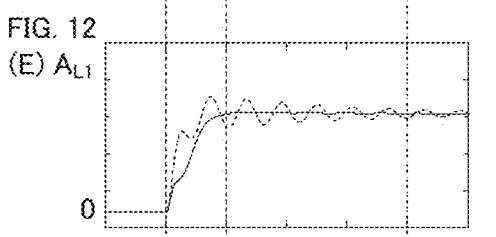
FIG. 12 (E) $A_{L1}$
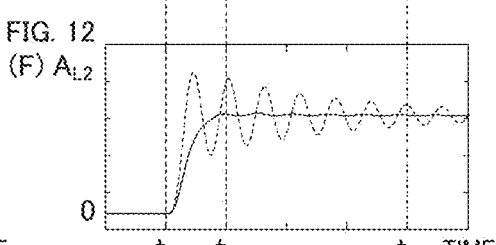
FIG. 12 (F) $A_{L2}$

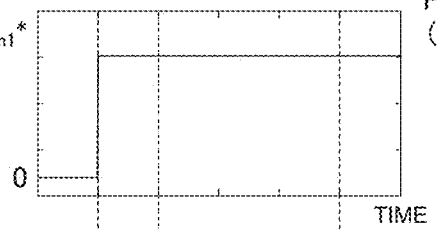
FIG. 13 (A) $T_{m1}^*$
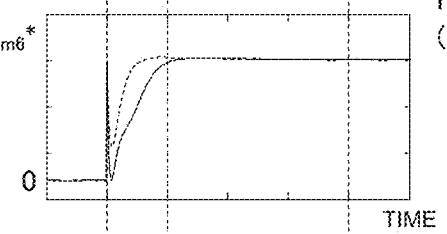
FIG. 13 (B) $T_{m6}^*$
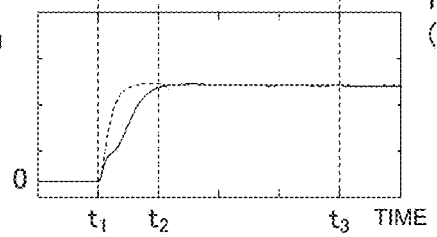
FIG. 13 (C) $T_d$
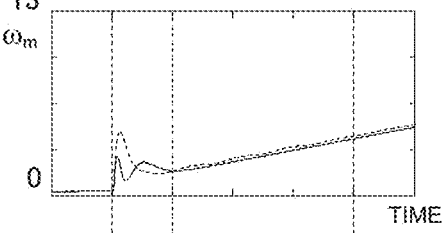
FIG. 13 (D) $\omega_m$
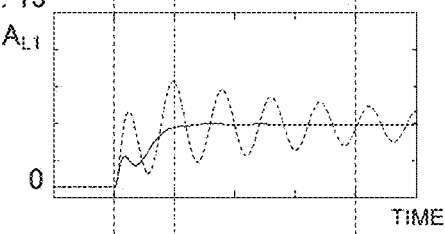
FIG. 13 (E) $A_{L1}$
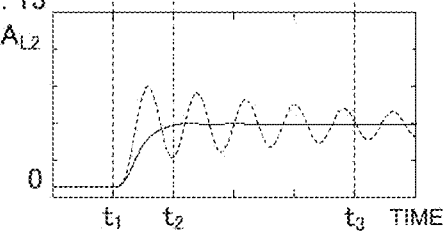
FIG. 13 (F) $A_{L2}$

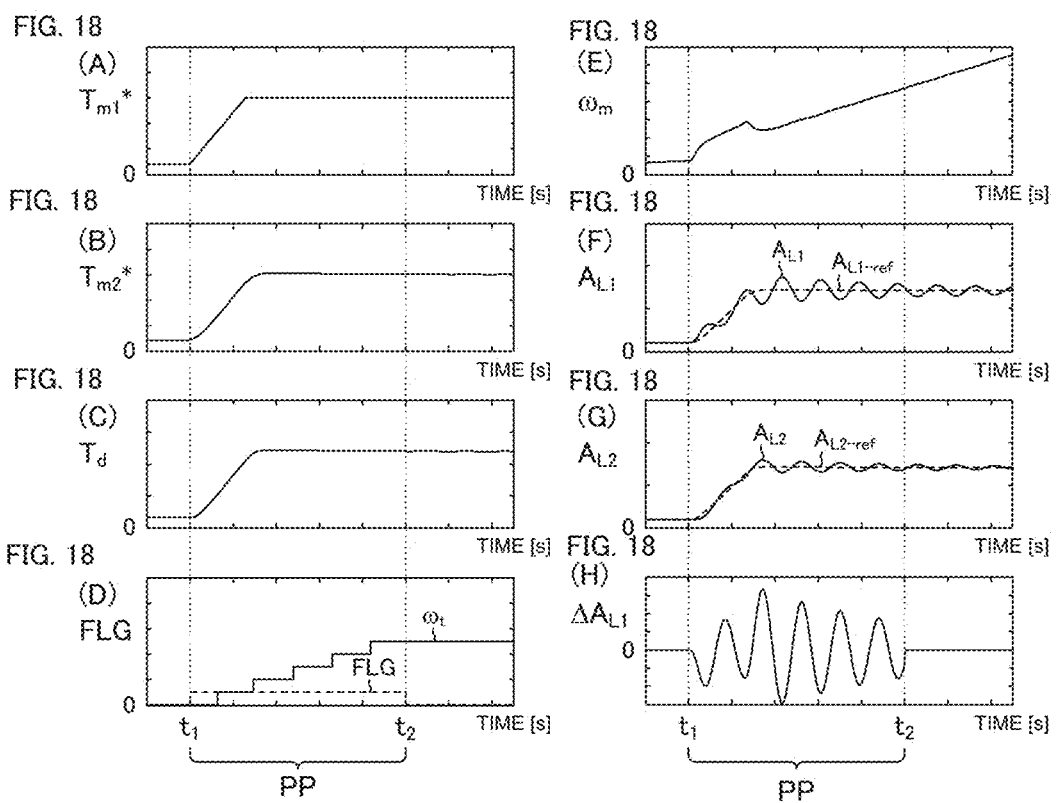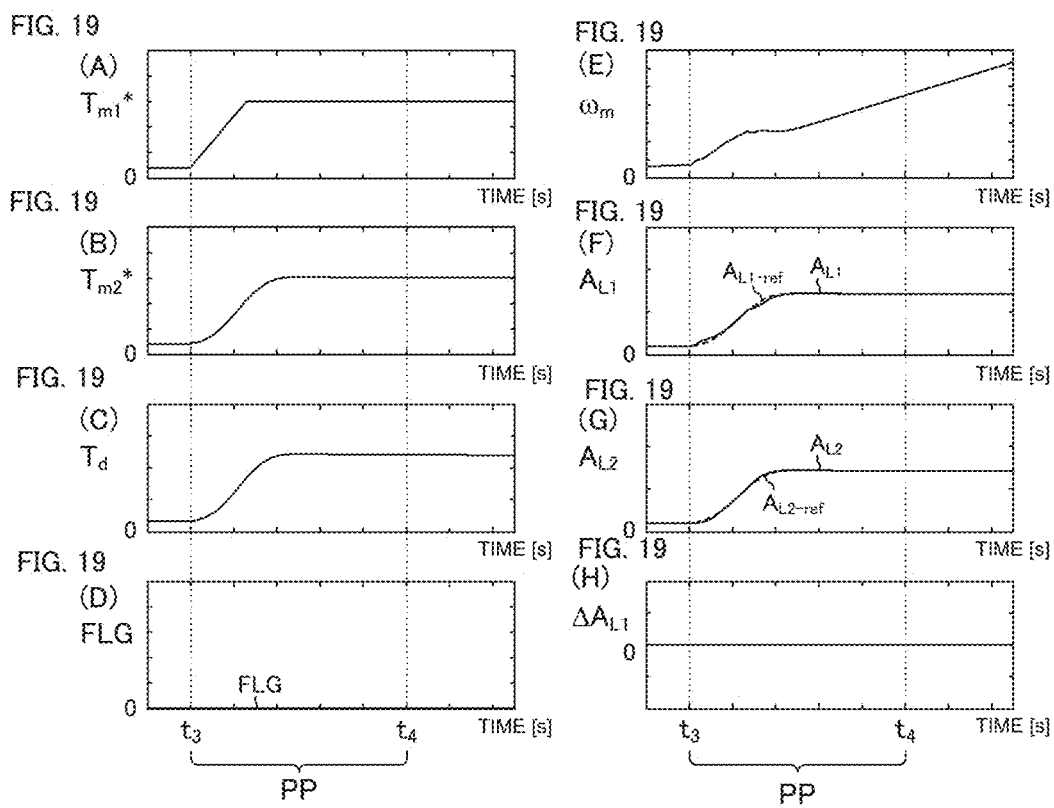

US 12,330,508 B2

CONTROL METHOD FOR ELECTRIC VEHICLE AND CONTROL DEVICE FOR ELECTRIC VEHICLE

CROSS-REFERENCE TO RELATED APPLICATION(S)

This application claims priority to Japanese Patent Application Serial No. 2022-006018, filed Jan. 18, 2022, the entire disclosure of which is hereby incorporated by reference.

TECHNICAL FIELD

The present invention relates to a control method for an electric vehicle and a control device for an electric vehicle.

BACKGROUND

JP2003-009566A discloses a control method for reducing vibration in an electric vehicle based on a torque transmission characteristic of a power transmission mechanism connected between an output shaft of a motor and driving wheels.

SUMMARY

By vibration damping control according to a torque transmission characteristic of a power transmission mechanism, for example, vibration caused by a road surface gradient, a gear backlash, torsion of a drive shaft, and the like is reduced.

On the other hand, the electric vehicle may travel while towing the other vehicle or the like. When the electric vehicle travels while towing the other vehicle or the like, a total weight of the towing electric vehicle and the towed other vehicle is a substantial vehicle weight of the electric vehicle. Accordingly, when the electric vehicle performs towing traveling, a change in the vehicle weight to be considered is a large change that cannot be ignored.

In addition, since the torque transmission characteristic of the power transmission mechanism is modeled based on the weight of the electric vehicle, when there is a large change in the substantial vehicle weight due to towing the other vehicle or the like, a sufficient vibration damping effect may not be obtained by the vibration damping control in the related art. The torque transmission characteristic of the power transmission mechanism is usually determined by a structure of the power transmission mechanism or the like, and does not reflect the presence or absence of towing. Therefore, by the vibration damping control in the related art, vibration caused by towing the other vehicle or the like is not sufficiently reduced. That is, when the electric vehicle performs towing traveling, a sufficient vibration damping effect cannot be obtained by the vibration damping control in the related art, and vibration occurs in the electric vehicle. As a result, when performing towing traveling, the electric vehicle may not be able to achieve a rise in torque or smooth acceleration required by a vehicle operation.

An object of the present invention is to provide a control method for an electric vehicle and a control device for an electric vehicle capable of achieving a rise in torque and smooth acceleration required by a vehicle operation even when the electric vehicle performs towing traveling.

One aspect of the present invention provides a control method for an electric vehicle that includes a motor as a drive source and a coupling portion coupled to the other vehicle, and travels while towing a coupled vehicle, which is the other vehicle coupled to the coupling portion. In this control method, a basic torque target value representing a torque to be output by the motor is calculated based on the vehicle operation. A final torque command value, which is a final command value for the torque, is calculated by performing correction processing for reducing a longitudinal vibration component generated in the electric vehicle due to the coupled vehicle being coupled to the coupling portion on the basic torque target value, based on a dynamic characteristic of the coupling portion to which the coupled vehicle is coupled. Then, the motor is controlled based on this final torque command value.

BRIEF DESCRIPTION OF THE DRAWINGS

FIG. 11 is a block diagram showing configurations of a current command value calculation unit and a current control processing unit;

FIGS. 12(A)-12(F) are a time chart showing a longitudinal acceleration and the like during towing traveling;

FIGS. 13(A)-13(F) are a time chart showing a longitudinal acceleration and the like when a weight of a coupled vehicle is large;

FIG. 17 is a flowchart related to updating of a natural vibration frequency and the like;

FIGS. 18(A)-18(H) are a time chart showing the longitudinal acceleration and the like in a traveling scene in which the natural vibration frequency and the like are updated;

FIGS. 19(A)-19(H) are a time chart showing the longitudinal acceleration and the like after updating the natural vibration frequency and the like.

DETAILED DESCRIPTION

Hereinafter, embodiments of the present invention will be described with reference to the drawings.

First Embodiment

Figure 1:
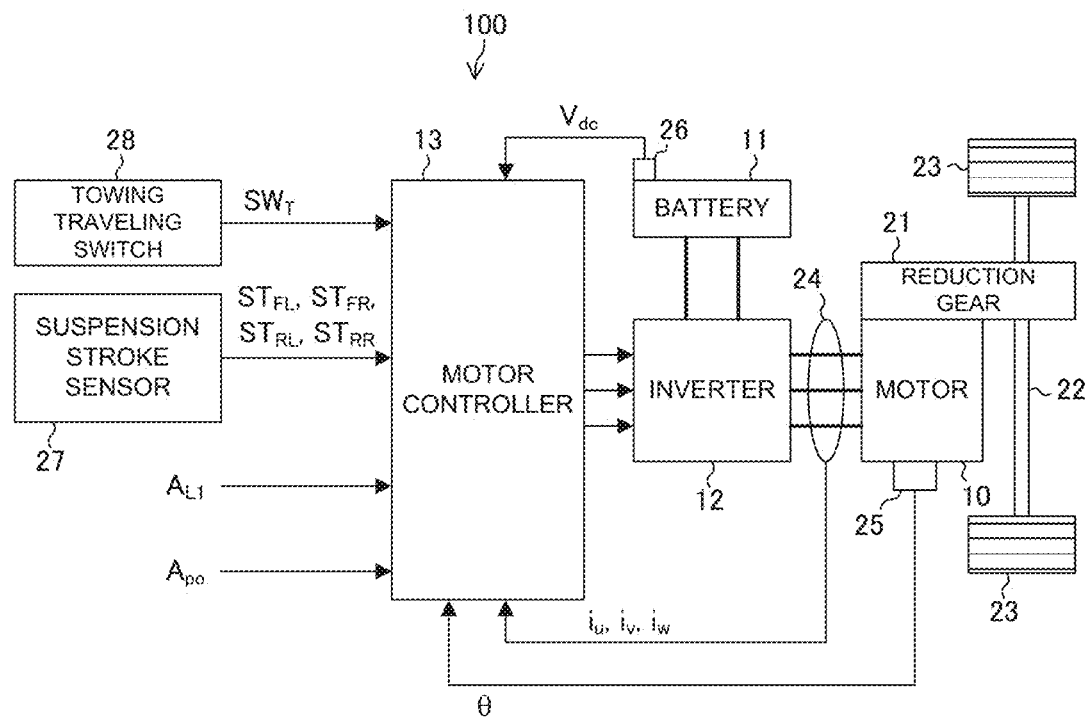
FIG. 1 is an explanatory diagram showing a schematic configuration of an electric vehicle.

FIG. 1 is an explanatory diagram showing a schematic configuration of an electric vehicle 100. The electric vehicle 100 is coupled to the other vehicle or the like, and can travel while towing the other vehicle or the like. The other vehicle or the like is, for example, a self-propelled vehicle or a vehicle (trailer) having no self-propelled capability. In the present embodiment, the electric vehicle 100 functions as a towing vehicle for towing the other vehicle or the like, but the electric vehicle 100 can travel without towing the other vehicle or the like. As shown in FIG. 1, the electric vehicle 100 includes a motor 10, a battery 11, an inverter 12, and a motor controller 13.

The motor 10 is a drive source of the electric vehicle 100. A torque generated by the motor 10 (hereinafter referred to as a motor torque $T_m$ (not shown)) is transmitted to driving wheels 23 via a reduction gear 21 and a drive shaft 22. When the motor 10 is rotated by the driving wheels 23, the motor 10 can generate a regenerative braking force on the driving wheels 23 through so-called regenerative control. Then, the motor 10 recovers kinetic energy of the electric vehicle 100 as electric energy. In the present embodiment, the motor 10 is, for example, a three-phase AC synchronous motor. Currents $i_u$, $i_v$, and $i_w$ flowing in the respective phases of the motor 10 can be detected using a current sensor 24. A rotor phase $\theta$ of the motor 10 is detected by a rotation sensor 25 such as a resolver or an encoder. Note that the reduction gear 21 and the drive shaft 22 constitute a power transmission mechanism (torque transmission system) that transmits power (torque) from the motor 10 to the driving wheels 23.

The battery 11 supplies electric power for driving the motor 10 via the inverter 12. The battery 11 can be charged with regenerative power generated in the motor 10 by the regenerative control. The battery 11 is a DC power supply. A DC voltage $V_{dc}$ output from the battery 11 is detected by, for example, a voltage sensor 26, and is acquired directly from the voltage sensor 26 or via a battery controller (not shown).

The inverter 12 converts the DC power supplied from the battery 11 into AC power and supplies the AC power to the motor 10. The inverter 12 converts AC regenerative power input from the motor 10 by the regenerative control into DC power and inputs the DC power to the battery 11. The inverter 12 includes a plurality of switching elements (not shown), and converts DC power from the battery 11 into AC power by turning on and off the switching elements. Similarly, the inverter 12 converts AC regenerative power input from the motor 10 into DC power by turning on and off the switching elements. Two pairs of switching elements are provided for each phase of the motor 10. The switching elements are, for example, power semiconductor elements such as insulated gate bipolar transistors (IGBTs) or metal oxide film semi-conductor field-effect transistors (MOSFET).

The motor controller 13 generates a PWM signal (pulse width modulation signal), which is a drive signal for the inverter 12, based on various vehicle variables, which are parameters indicating a control state of the electric vehicle 100 or each unit constituting the electric vehicle 100. Then, the motor controller 13 controls the motor 10 by driving the inverter 12 according to the generated PWM signal.

In the present embodiment, the motor controller 13 acquires or calculates, as the vehicle variables, the rotor phase $\theta$, the currents $i_u$, $i_v$, $i_w$, the DC voltages $V_{dc}$, a longitudinal acceleration $A_{L1}$, an accelerator opening $A_{po}$, suspension stroke amounts $ST_{FL}$, $ST_{FR}$, $ST_{RL}$, $ST_{RR}$, a towing traveling signal $SW_T$, and the like.

The longitudinal acceleration $A_{L1}$ is an acceleration in a longitudinal direction (vertical direction) of the electric vehicle 100, and is detected by, for example, an acceleration sensor (not shown). The longitudinal acceleration $A_{L1}$ may be acquired from a controller (not shown). The accelerator opening $A_{po}$ is a parameter indicating an operation amount of an accelerator provided in the electric vehicle 100, and is detected by a sensor (not shown) or the like. The accelerator opening $A_{po}$ indicates a required amount of driving force (torque) for the electric vehicle 100 corresponding to a vehicle operation.

The suspension stroke amounts $ST_{FL}$, $ST_{FR}$, $ST_{RL}$, and $ST_{RR}$ are stroke amounts of suspensions provided on a left front wheel, a right front wheel, a left rear wheel, and a right rear wheel of the electric vehicle 100, respectively. The suspension stroke amounts $ST_{FL}$, $ST_{FR}$, $ST_{RL}$, and $ST_{RR}$ are detected by a suspension stroke sensor 27 provided in each suspension. Note that in the present embodiment, the front wheels of the electric vehicle 100 are the driving wheels 23, and the rear wheels are driven wheels.

The towing traveling signal $SW_T$ is a signal output from a towing traveling switch 28. The towing traveling switch 28 is a control mode changeover switch that is operated by a driver or the like when the other vehicle is coupled to a coupling portion 101 (see FIG. 4) of the electric vehicle 100 and the electric vehicle 100 travels while towing the other vehicle. The coupling portion 101 is a member that is coupled to the other vehicle or the like, and is a towing member such as a so-called trailer hitch. Hereinafter, the other vehicle or the like (a vehicle to be towed or the like) coupled to the coupling portion 101 and towed by the electric vehicle 100 is referred to as a "coupled vehicle 102".

In the present embodiment, the towing traveling signal $SW_T$ is a determination criterion indicating whether the electric vehicle 100 is in towing traveling. Specifically, when the electric vehicle 100 travels while towing the coupled vehicle 102, the towing traveling signal $SW_T$ is set to ON by an operation of the towing traveling switch 28. Then, the motor controller 13 determines whether the coupled vehicle 102 is coupled to the coupling portion 101, that is, whether the electric vehicle is in towing traveling, based on the towing traveling signal $SW_T$. Then, according to the determination result, the motor controller 13 changes a content of the vibration damping control for reducing the vibration generated in the electric vehicle 100.

Figure 2:
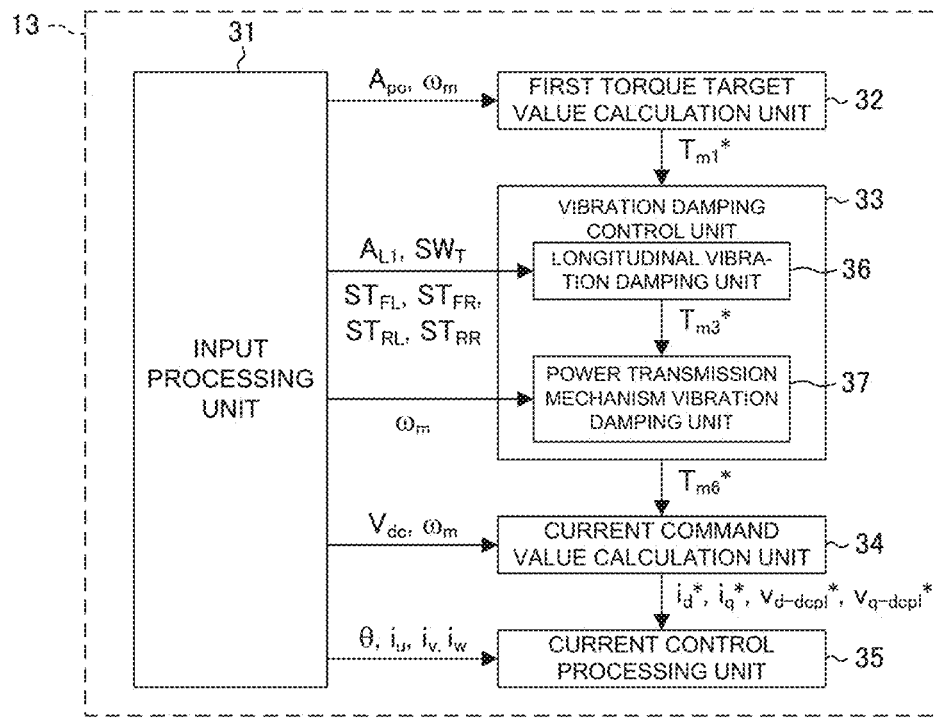
FIG. 2 is a block diagram showing a configuration of a motor controller.

FIG. 2 is a block diagram showing a configuration of the motor controller 13. The motor controller 13 is implemented by one or a plurality of computers, and is programmed so as to repeatedly execute processing of each unit described below in a predetermined cycle. Specifically, the motor controller 13 includes an input processing unit 31, a first torque target value calculation unit 32 (basic torque target value calculation unit), a vibration damping control unit 33 (correction processing unit), a current command value calculation unit 34, and a current control processing unit 35.

The input processing unit 31 acquires the vehicle variables used for various controls and/or calculations executed by the motor controller 13, or executes input processing for calculations. For example, the input processing unit 31 acquires, as the vehicle variables, the rotor phase θ, the currents $i_u$, $i_v$, the DC voltages $V_{dc}$, the longitudinal acceleration $A_{L1}$, the accelerator opening $A_{po}$, the suspension stroke amounts $ST_{FL}$, $ST_{FR}$, $ST_{RL}$, $ST_{RR}$, and the towing traveling signal $SW_T$.

The input processing unit 31 calculates a rotor angular velocity m [rad/s](electric angular velocity) of the motor 10 by differentiating the rotor phase θ (electric angle). The input processing unit 31 calculates a rotation speed of the motor 10 (hereinafter, referred to as a motor rotation speed) $\omega_m$ [rad/s](mechanical angular velocity) by dividing the rotor angular velocity ω by the number of pole pairs of the motor 10. In addition, the input processing unit 31 may calculate a motor rotation speed $N_m$ [rpm] by multiplying the motor rotation speed $\omega_m$ by a unit conversion coefficient (60/2π).

In the present embodiment, the current sensor 24 detects the U-phase current $i_u$ and the V-phase current $i_v$. Therefore, the input processing unit 31 calculates the W-phase current $i_w$ using the U-phase current $i_u$ and the V-phase current $i_v$ based on the following equation (1).

[Math. 1]

$$i_w = -i_u - i_v \quad (1)$$

The first torque target value calculation unit 32 calculates a first torque target value $T_{m1}*$ based on the accelerator opening $A_{po}$ and the motor rotation speed $\omega_m$. The first torque target value $T_{m1}*$ is a torque target value calculated based on a vehicle operation, and indicates a torque (motor torque $T_m$) to be output by the motor 10. That is, the first torque target value $T_{m1}*$ is a basic torque target value (basic torque target value) for generating the driving force required for the electric vehicle 100.

Figure 3:
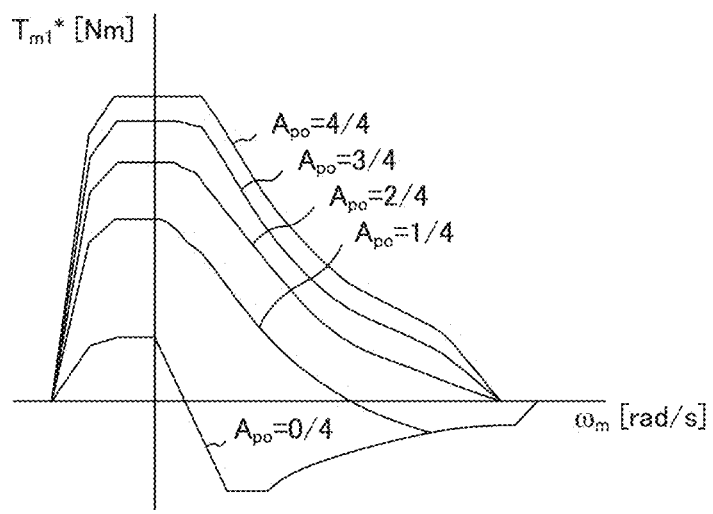
FIG. 3 is a graph showing an example of an accelerator opening-torque table.

FIG. 3 is a graph showing an example of an accelerator opening-torque table. As shown in FIG. 3, it is a table in which the accelerator opening $A_{po}$ and the motor rotation speed $\omega_m$ are associated with the first torque target value $T_{m1}*$ in advance through experiment, simulation, or the like. The first torque target value calculation unit 32 calculates the first torque target value $T_{m1}*$ by referring to the accelerator opening-torque table based on the accelerator opening $A_{po}$ and the motor rotation speed $\omega_m$.

The vibration damping control unit 33 (see FIG. 2) executes vibration damping control processing of calculating a sixth torque target value $T_{m6}*$ by correcting the first torque target value $T_{m1}*$ so as to reduce the vibration generated in the electric vehicle 100. The sixth torque target value $T_{m6}*$ is used as a final torque command value, which is a final command value for the torque to be output by the motor 10.

In the present embodiment, there are two types of vibration generated in the electric vehicle 100. One is natural vibration that is generated by the coupled vehicle 102 being coupled to the coupling portion 101 when the electric vehicle 100 travels while towing the coupled vehicle 102. This vibration is generated in the longitudinal direction of the electric vehicle 100. Hereinafter, the vibration corresponding to the change in the acceleration in the longitudinal direction caused by the coupled vehicle 102 being coupled to the coupling portion 101 is referred to as longitudinal vibration. The other vibration is the vibration generated by transmitting the motor torque $T_m$ to the driving wheels 23 by the power transmission mechanism. This vibration includes, for example, vibration caused by disturbance such as a road surface gradient, and vibration caused by gear backlash, torsion of the drive shaft 22, and the like. Hereinafter, the vibration generated in the power transmission mechanism is referred to as power transmission mechanism vibration.

In the present embodiment, in order to reduce the vibration, the vibration damping control unit 33 includes a longitudinal vibration damping unit 36 and a power transmission mechanism vibration damping unit 37.

The longitudinal vibration damping unit 36 executes longitudinal vibration damping processing. The longitudinal vibration damping processing is processing of reducing the longitudinal vibration generated when the coupled vehicle 102 is towed based on a dynamic characteristic of the coupling portion 101 to which the coupled vehicle 102 is coupled. The dynamic characteristic of the coupling portion 101 to which the coupled vehicle 102 is coupled refers to a change over time in movement of a coupling part (including the coupling portion 101) caused by the coupled vehicle 102 being coupled to the coupling portion 101. For example, a natural vibration frequency $\omega_t$ and an attenuation coefficient $\zeta_t$ are indices or parameters for identifying the change over time of the coupling part. Therefore, in the present embodiment, the change over time of the coupling part is identified by the natural vibration frequency $\omega_t$, or the attenuation coefficient $\zeta_t$, or both the natural vibration frequency $\omega_t$ and the attenuation coefficient $\zeta_t$.

Specifically, the longitudinal vibration damping unit 36 determines whether the coupled vehicle 102 is coupled to the coupling portion 101 based on the towing traveling signal $SW_T$.

When the coupled vehicle 102 is coupled to the coupling portion 101, the longitudinal vibration damping unit 36 calculates a second torque target value $T_{m2}*$ (see FIG. 5) by executing first vibration damping correction processing on the first torque target value $T_{m1}*$ for reducing or eliminating a longitudinal vibration component. Then, the longitudinal vibration damping unit 36 outputs the second torque target value $T_{m2}*$ as a third torque target value $T_{m3}*$ output from the longitudinal vibration damping unit 36. The longitudinal vibration damping unit 36 performs the first vibration damping correction processing based on the longitudinal acceleration $A_{L1}$ and the suspension stroke amounts $ST_{FL}$, $ST_{FR}$, $ST_{RL}$, and $ST_{RR}$.

On the other hand, when the coupled vehicle 102 is not coupled to the coupling portion 101, that is, when no longitudinal vibration is generated, the longitudinal vibration damping unit 36 outputs the first torque target value $T_{m1}*$ as the third torque target value $T_{m3}*$.

The power transmission mechanism vibration damping unit 37 calculates the sixth torque target value $T_{m6}*$ without sacrificing the response of the driving wheels 23 by performing second vibration damping correction processing (power transmission mechanism vibration damping processing) for further reducing the power transmission mechanism vibration on the third torque target value $T_{m3}*$. The power transmission mechanism vibration damping unit 37 performs the second vibration damping correction processing based on the motor rotation speed $\omega_m$.

The current command value calculation unit 34 calculates a d-axis current target value $i_d*$ and a q-axis current target value $i_q*$ (hereinafter, referred to as dq-axis current target values $i_d*$, $i_q*$) based on the sixth torque target value $T_{m6}*$, the motor rotation speed $\omega_m$, and the DC voltage $V_{dc}$. The current command value calculation unit 34 also calculates a d-axis non-interference voltage $V_{d-dcpl}*$ and a q-axis non-interference voltage $V_{q-dcpl}*$ (hereinafter, referred to as non-interference voltages $V_{d-dcpl}*$, $V_{q-dcpl}*$) in order to reduce a current due to interference between the d-axis and the q-axis. The current command value calculation unit 34 includes, for example, a map in which the sixth torque target value $T_{m6}^*$, the motor rotation speed $\omega_m$, and the DC voltage $V_{dc}$ are associated with the dq-axis current target values $i_d^*$, $i_q^*$ and the non-interference voltages $V_{d\text{-}dcpl}^*$, $V_{q\text{-}dcpl}^*$ in advance by experiment or the like. Therefore, the current command value calculation unit 34 calculates the dq-axis current target values $i_d^*$, $i_q^*$ and the non-interference voltages $V_{d\text{-}dcpl}^*$, $V_{q\text{-}dcpl}^*$ corresponding to the sixth torque target value $T_{m6}^*$, the motor rotation speed $\omega_m$, and the DC voltage $V_{dc}$ by referring to this map.

The current control processing unit 35 calculates, based on the dq-axis current target values $i_d^*$, $i_q^*$ and the non-interference voltages $V_{d\text{-}dcpl}^*$, $V_{q\text{-}dcpl}^*$, PWM signals $D_{uu}^*$, $D_{ul}^*$, $D_{vu}^*$, $D_{vl}^*$, $D_{wu}^*$, and $D_{wl}^*$ (see FIG. 11). The current control processing unit 35 drives the inverter 12 based on the PWM signals $D_{uu}^*$, $D_{ul}^*$, $D_{vu}^*$, $D_{vl}^*$, $D_{wu}^*$, and $D_{wl}^*$, and then outputs the motor torque $T_m$ corresponding to the sixth torque target value $T_{m6}^*$.

Hereinafter, specific configurations of the vibration damping control unit 33 and the current control processing unit 35 among the units of the motor controller 13 configured as described above will be described in detail.

[Configuration of Vibration Damping Control Unit]

First, a dynamic model of the electric vehicle 100 in which the coupled vehicle 102 is coupled to the coupling portion 101 and a transmission characteristic $G_p(s)$ from the motor torque $T_m$ to the motor rotation speed $\omega_m$ in the electric vehicle 100 will be described.

Figure 4:
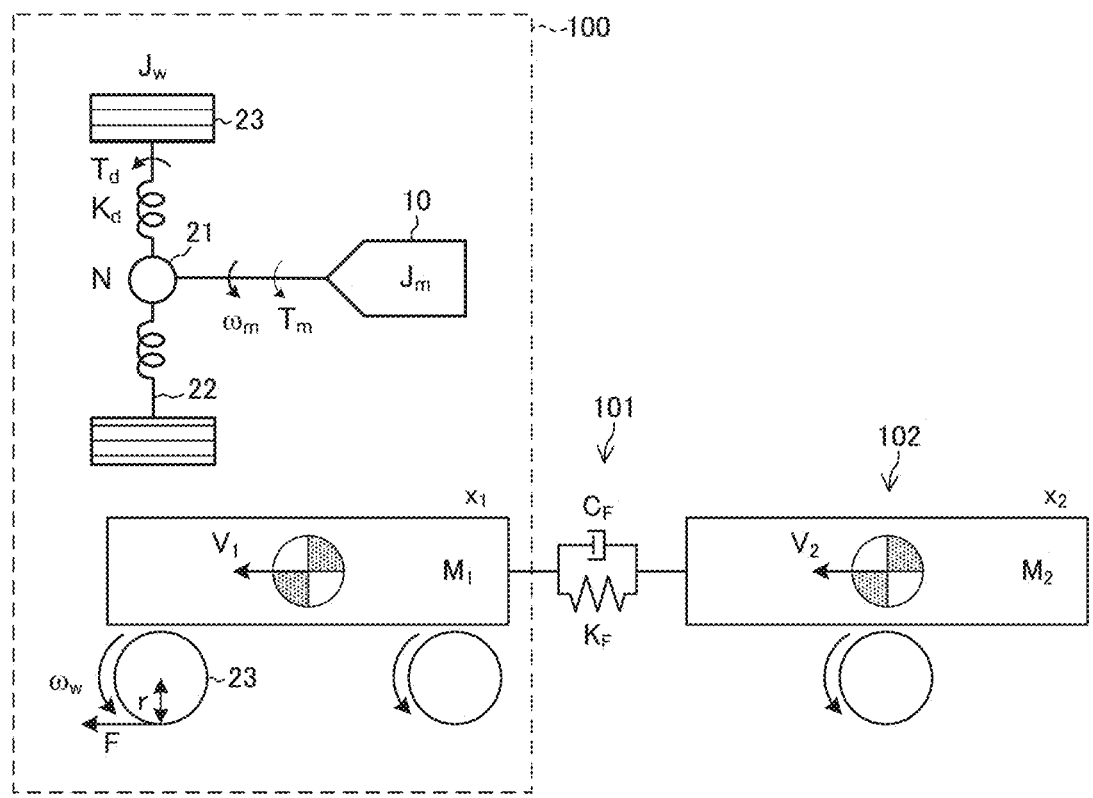
FIG. 4 is an explanatory diagram showing a dynamic model of an electric vehicle in which a coupled vehicle is coupled to a coupling portion.

FIG. 4 is an explanatory diagram showing the dynamic model of the electric vehicle 100 in which the coupled vehicle 102 is coupled to the coupling portion 101. According to the dynamic model shown in FIG. 4, an equation of motion of the electric vehicle 100 can be expressed by the following equations (2) to (7). The equation of motion of the electric vehicle 100 in which the coupled vehicle 102 is coupled to the coupling portion 101 can be expressed by the following equations (8) to (11).

[Math. 2]

$$J_m \cdot \omega_m \cdot s = T_m - T_d/N \quad (2)$$

$$2J_w \cdot \omega_w \cdot s = T_d - rF \quad (3)$$

$$M_1 \cdot V_1 \cdot s = F + F_r \quad (4)$$

$$T_d = K_d \cdot \theta_d \quad (5)$$

$$F = K_t \cdot (r\omega_m - v_1) \quad (6)$$

$$\theta_d = \frac{\theta_m}{N} - \theta_w \quad (7)$$

$$F_r = C_F \cdot s \cdot (x_2 - x_1) + K_F \cdot (x_2 - x_1) \quad (8)$$

$$M_2 \cdot s^2 \cdot x_1 = -C_F \cdot s \cdot (x_2 - x_1) - K_F \cdot (x_2 - x_1) \quad (9)$$

$$v_1 = s \cdot x_1 \quad (10)$$

$$v_2 = s \cdot x_2 \quad (11)$$

Parameters and the like shown in FIG. 4 and the above-described equations of motion are as follows. Note that "s" is a Laplace operator.

$J_m$: motor inertia
$J_w$: driving wheel inertia (for one wheel)
$K_d$: torsional rigidity of drive shaft
$K_t$: coefficient relating to tire and road surface
N: overall gear ratio
r: load radius of tire
$\omega_m$: motor rotation speed
$\omega_w$: driving wheel rotation speed
$\theta_m$: motor angle
$\theta_w$: driving wheel angle
$T_m$: motor torque
$T_d$: drive shaft torque
F: driving force (for two wheels)
$v_1$: vehicle speed of electric vehicle
$v_2$: vehicle speed of coupled vehicle
$x_1$: traveling distance of electric vehicle
$x_2$: traveling distance of coupled vehicle
$M_1$: weight of electric vehicle
$M_2$: weight of coupled vehicle
$C_F$: viscosity characteristic (viscosity coefficient)
$K_F$: elastic characteristic (elastic coefficient)
$F_r$: force applied to coupling portion When the transmission characteristic $G_p(s)$ from the motor torque $T_m$ to the motor rotation speed $\omega_m$ is obtained based on the equations (2) to (7), the following equation (12) is obtained.

[Math. 3]

$$G_p(s) = \frac{1}{s} \cdot \frac{b_3 s^3 + b_2 s^2 + b_1 s + b_0}{a_3 s^3 + a_2 s^2 + a_1 s + a_0} \quad (12)$$

Each parameter in the equation (12) is expressed by the equation (13) below. Note that in the equation (13), "M" is a total weight of the electric vehicle 100 and the coupled vehicle 102(=$M_1+M_2$).

[Math. 4]

$$a_3 = 2J_m J_w M \quad (13)$$
$$a_2 = K_t J_m (2J_w + r^2 M)$$
$$a_1 = K_d M (J_m + 2J_w/N^2)$$
$$a_0 = K_d K_t (J_m + 2J_w/N^2 + r^2 M/N^2)$$
$$b_3 = 2J_w M$$
$$b_2 = K_t (2J_w + r^2 M)$$
$$b_1 = 2K_d M$$
$$b_0 = 2K_d K_t$$

When a pole and a zero-point of the transmission characteristic $G_p(s)$ shown in the equation (12) are examined, it can be approximated to the form shown in the following equation (14). Then, one pole and one zero-point show extremely close values. It means that $\alpha$ and $\beta$ in the equation (14) indicate extremely close values.

[Math. 5]

$$G_p(s) = \frac{1}{s} \cdot \frac{(s+\beta) \cdot (b_2' s^2 + b_1' s + b_0')}{(s+\alpha) \cdot (s^2 + 2\zeta_p \omega_p s + \omega_p^2)} \quad (14)$$

In accordance with the equation (14), by performing pole zero cancellation approximate to $\alpha=\beta$, as shown in the following equation (15), a (second-order)/(third-order) transmission characteristic $G_p(s)$ is obtained. In the equation (15), "$\omega_p$" is a frequency of natural vibration generated by the transmission of the motor torque $T_m$ by the power transmission mechanism. In the equation (15), "$\zeta_p$" is an attenuation coefficient of the natural vibration generated by the power transmission mechanism.

[Math. 6]

$$G_p(s) = \frac{1}{s} \cdot \frac{b_2' s^2 + b_1' s + b_0'}{s^2 + 2\zeta_p \omega_p s + \omega_p^2} \quad (15)$$

The transmission characteristic $G_p(s)$ expressed by the above equation (15) is a vehicle model of the electric vehicle 100. A transmission characteristic $G_r(s)$ of a model response when the attenuation coefficient $\zeta_p$ is set to "1" is expressed by the following equation (16).

[Math. 7]

$$G_r(s) = \frac{1}{s} \cdot \frac{b_2' s^2 + b_1' s + b_0'}{s^2 + 2\omega_p s + \omega_p^2} \quad (16)$$

According to the equations (2) to (6) among the equations of motion of the electric vehicle 100, a transmission characteristic $G_{pF}(s)$ from the motor torque $T_m$ to a driving force F is expressed by the following equation (17).

[Math. 8]

$$G_{pF}(s) = \frac{c_0}{(s+\alpha) \cdot (s^2 + 2\zeta_p \omega_p s + \omega_p^2)} \quad (17)$$

The transmission characteristic from the driving force F(s) of the electric vehicle 100 to the vehicle speed $v_2(s)$ of the coupled vehicle 102 is expressed by the following equation (18) according to the equations (8) to (11) which are equations of motion of the electric vehicle 100 in which the coupled vehicle 102 is coupled to the coupling portion 101.

[Math. 9]

$$v_2(s) = \frac{C_F s + K_F}{s\{M_1 M_2 s^2 + (M_1 + M_2) C_F s + (M_1 + M_2) K_F\}} F(s) \quad (18)$$

The transmission characteristic of the equation (18) can be approximated to a transmission characteristic of a secondary vibration system as shown in the following equation (19) by examining the poles thereof. In the equation (19), "$\omega_t$" is a natural vibration frequency of the longitudinal vibration generated in the electric vehicle 100 due to the coupling of the coupled vehicle 102 to the coupling portion 101. In the equation (19), "$\zeta_t$" is an attenuation coefficient of this natural vibration.

[Math. 10]

$$v_2(s) = \frac{1}{s} \cdot \frac{C_F s + K_F}{\alpha(s^2 + 2\zeta_t \omega_t s + \omega_t^2)} F(s) \quad (19)$$

Hereinafter, specific configurations of the longitudinal vibration damping unit 36 and the power transmission mechanism vibration damping unit 37 constituting the vibration damping control unit 33 will be described in detail on the premise of the equations of motion, the transmission characteristics, and the like.

Figure 5:
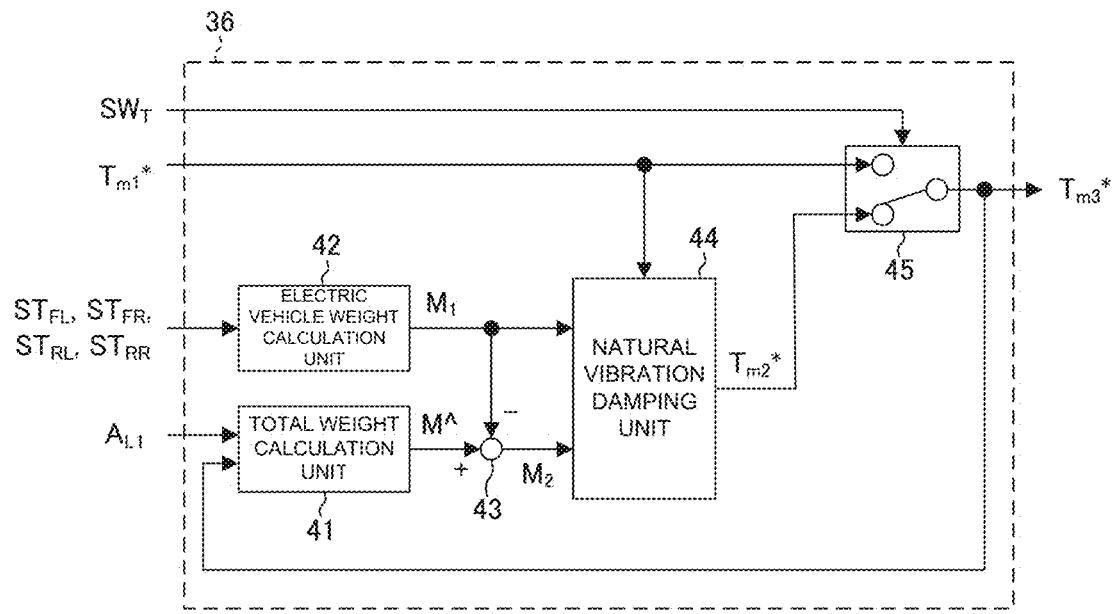
FIG. 5 is a block diagram showing a configuration of a longitudinal vibration damping unit.

FIG. 5 is a block diagram showing the configuration of the longitudinal vibration damping unit 36 (see FIG. 2). As shown in FIG. 5, the longitudinal vibration damping unit 36 includes a total weight calculation unit 41, an electric vehicle weight calculation unit 42, a coupled vehicle weight calculation unit 43, a natural vibration damping unit 44, and a torque target value switching unit 45.

The total weight calculation unit 41 estimates a total weight M^ based on the longitudinal acceleration $A_{L1}$ and the third torque target value $T_{m3}$* (previous value). The total weight M^ is an estimation value of the total weight M that is the sum of the weight of the electric vehicle 100 (hereinafter referred to as an electric vehicle weight $M_1$) and the weight of the coupled vehicle 102 (hereinafter referred to as a coupled vehicle weight $M_2$). The total weight M^ is input to the coupled vehicle weight calculation unit 43.

The electric vehicle weight calculation unit 42 estimates the electric vehicle weight $M_1$ based on the suspension stroke amounts $ST_{FL}$, $ST_{FR}$, $ST_{RL}$, and $ST_{RR}$. The electric vehicle weight $M_1$ is input to the coupled vehicle weight calculation unit 43 and the natural vibration damping unit 44.

The coupled vehicle weight calculation unit 43 estimates the coupled vehicle weight $M_2$ based on the total weight M^ and the electric vehicle weight $M_1$. In the present embodiment, the coupled vehicle weight calculation unit 43 calculates the coupled vehicle weight $M_2$ by subtracting the electric vehicle weight $M_1$ from the total weight M^. The coupled vehicle weight $M_2$ is input to the natural vibration damping unit 44.

The natural vibration damping unit 44 performs the first vibration damping correction processing for reducing (lowering or eliminating) the longitudinal vibration component on the first torque target value $T_{m1}$* based on a dynamic characteristic of the coupling portion 101 coupled to the coupled vehicle 102. The natural vibration damping unit 44 identifies the dynamic characteristic (transmission characteristic) of the coupling portion 101 to which the coupled vehicle 102 is coupled based on the electric vehicle weight $M_1$, the coupled vehicle weight $M_2$, and a viscosity characteristic $C_F$, an elastic characteristic $K_F$, and the like, which are mechanical characteristics of the coupling portion 101. The dynamic characteristic of the coupling portion 101 corresponds to the natural longitudinal vibration generated in the electric vehicle 100 and the coupled vehicle 102.

Specifically, based on the electric vehicle weight $M_1$ and the coupled vehicle weight $M_2$, the natural vibration damping unit 44 calculates the second torque target value $T_{m2}$* by correcting the first torque target value $T_{m1}$* using the viscosity characteristic $C_F$ and the elastic characteristic $K_F$. In this way, the natural vibration damping unit 44 reduces the longitudinal vibration, which is the natural vibration generated in the electric vehicle 100 during towing traveling. The second torque target value $T_{m2}$* is input to the torque target value switching unit 45.

The torque target value switching unit 45 determines whether the coupled vehicle 102 is coupled to the coupling portion 101 based on the towing traveling signal $SW_T$. Then, based on the determination result, the torque target value switching unit 45 switches the torque target value output as the third torque target value $T_{m3}$* to either the first torque target value $T_{m1}$* or the second torque target value $T_{m2}$*. Specifically, when the towing traveling signal $SW_T$ is OFF and it is determined that the coupled vehicle 102 is not coupled, the torque target value switching unit 45 sets the first torque target value $T_{m1}$* as the third torque target value $T_{m3}$*, and outputs the third torque target value $T_{m3}$* to the power transmission mechanism vibration damping unit 37. On the other hand, when the towing traveling signal $SW_T$ is ON and it is determined that the coupled vehicle 102 is coupled, the torque target value switching unit 45 sets the second torque target value $T_{m2}^*$ as the third torque target value $T_{m3}^*$ and outputs the third torque target value $T_{m3}^*$ to the power transmission mechanism vibration damping unit 37.

Figure 6:
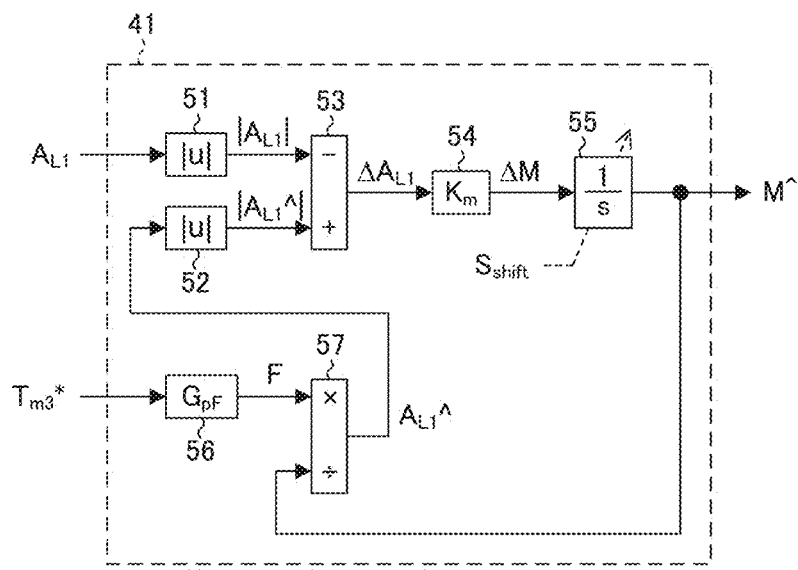
FIG. 6 is a block diagram showing a configuration of a total weight calculation unit.

FIG. 6 is a block diagram showing a configuration of the total weight calculation unit 41 (see FIG. 5). As shown in FIG. 6, the total weight calculation unit 41 includes a first absolute value calculation unit 51, a second absolute value calculation unit 52, an acceleration difference calculation unit 53, a gain multiplication unit 54, an integration unit 55, a driving force calculation unit 56, and a longitudinal acceleration estimation unit 57.

The first absolute value calculation unit 51 calculates an absolute value $|A_{L1}|$ of the longitudinal acceleration $A_{L1}$, which is a detection value. The absolute value $|A_{L1}|$ of the longitudinal acceleration $A_L$ is input to the acceleration difference calculation unit 53.

The second absolute value calculation unit 52 calculates an absolute value $|A_{L1}\hat{}|$ of a longitudinal acceleration estimation value $A_{L1}\hat{}$. The longitudinal acceleration estimation value $A_{L1}\hat{}$ is an acceleration in the longitudinal direction estimated from the third torque target value $T_{m3}^*$, and is calculated by the driving force calculation unit 56 and the longitudinal acceleration estimation unit 57 based on the third torque target value $T_{m3}^*$. The absolute value $|A_{L1}\hat{}|$ of the longitudinal acceleration estimation value $A_{L1}\hat{}$ is input to the acceleration difference calculation unit 53.

The acceleration difference calculation unit 53 calculates an acceleration difference $\Delta A_{L1}$ between the absolute value $|A_{L1}|$ of the longitudinal acceleration $A_{L1}$ and the absolute value $|A_{L1}\hat{}|$ of the longitudinal acceleration estimation value $A_{L1}\hat{}$. In the present embodiment, the acceleration difference $\Delta A_{L1}$ is calculated by subtracting the absolute value $|A_{L1}|$ of the longitudinal acceleration $A_{L1}$ from the absolute value $|A_{L1}\hat{}|$ of the longitudinal acceleration estimation value $A_{L1}\hat{}$.

The gain multiplication unit 54 calculates a corrected total weight $\Delta M$ by multiplying the acceleration difference $\Delta A_{L1}$ by a weight setting gain $K_m$. The weight setting gain Km is determined in advance by experiment, simulation, or the like. The corrected total weight $\Delta M$ represents a time change rate of the total weight M, that is, a change amount of the total weight M in each control cycle (unit time).

The integration unit 55 calculates the total weight $M\hat{}$ by adding up (integrating) the corrected total weight $\Delta M$ for each control cycle. Note that the integration unit 55 may initialize the total weight $M\hat{}$ based on a shift operation or the like by the driver. For example, the integration unit 55 acquires a shift operation signal $S_{shift}$. When the shift operation signal $S_{shift}$ indicates a shift operation to a parking range, the integration unit 55 initializes the total weight $M\hat{}$. An initial value of the total weight $M\hat{}$ is, for example, a design weight $M_{ini}$ of the electric vehicle 100.

The driving force calculation unit 56 calculates the driving force F of the electric vehicle 100 based on the third torque target value $T_{m3}^*$. In the present embodiment, the driving force F is calculated by applying the transmission characteristic $G_{pF}(s)$ from the motor torque $T_m$ to the driving force F to the third torque target value $T_{m3}^*$.

The longitudinal acceleration estimation unit 57 estimates the longitudinal acceleration estimation value $A_{L1}\hat{}$ based on the driving force F calculated by the driving force calculation unit 56 and the total weight $M\hat{}$ (previous value). Specifically, the longitudinal acceleration estimation value $A_{L1}\hat{}$ is calculated by dividing the driving force F by the total weight $M\hat{}$.

Figure 7:
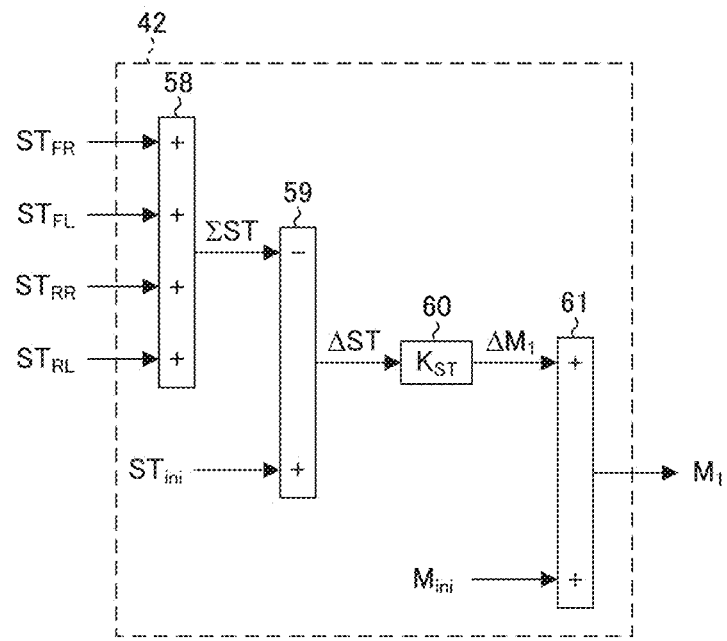
FIG. 7 is a block diagram showing a configuration of an electric vehicle weight calculation unit.

FIG. 7 is a block diagram showing a configuration of the electric vehicle weight calculation unit 42 (see FIG. 5). As shown in FIG. 7, the electric vehicle weight calculation unit 42 includes a total stroke amount calculation unit 58, a stroke amount change calculation unit 59, a weight change calculation unit 60, and an addition unit 61.

The total stroke amount calculation unit 58 calculates a total stroke amount EST of each suspension by adding up the suspension stroke amounts $ST_{FL}$, $ST_{FR}$, $ST_{RL}$, and $ST_{RR}$.

The stroke amount change calculation unit 59 calculates a suspension stroke change amount $\Delta ST$ by subtracting the total stroke amount $\Sigma ST$ from a reference total stroke amount $ST_{ini}$. The reference total stroke amount $ST_{ini}$ is a reference value determined in advance by a design of the electric vehicle 100.

The weight change calculation unit 60 calculates a weight change amount $\Delta M_1$ of electric vehicle 100 by multiplying the suspension stroke change amount $\Delta ST$ by a spring constant $K_{ST}$ [N/mm]. The spring constant $K_{ST}$ is determined in advance according to the design of the electric vehicle 100 (each suspension).

The addition unit 61 calculates the electric vehicle weight $M_1$, which is an estimation value of the weight of the electric vehicle 100, by adding the design weight $M_{ini}$ of the electric vehicle 100 and the weight change amount $\Delta M_1$.

Figure 8:
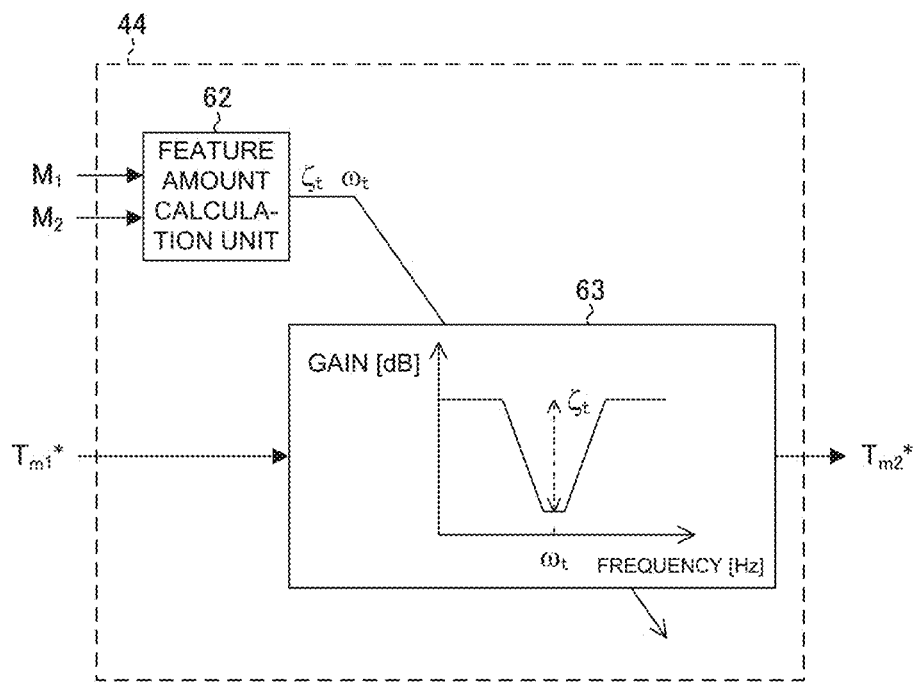
FIG. 8 is a block diagram showing a configuration of a natural vibration damping unit.

FIG. 8 is a block diagram showing a configuration of the natural vibration damping unit 44 (see FIG. 5). As illustrated in FIG. 8, the natural vibration damping unit 44 includes a feature amount calculation unit 62 and a first vibration damping correction processing unit 63.

The feature amount calculation unit 62 identifies the dynamic characteristic of the coupling portion 101 to which the coupled vehicle 102 is coupled by calculating feature amounts of the longitudinal vibration caused by the coupled vehicle 102 being coupled to the coupling portion 101. Specifically, the feature amount calculation unit 62 calculates the natural vibration frequency $\omega_t$ and the attenuation coefficient $\zeta_t$, which are the feature amounts of the longitudinal vibration, based on the electric vehicle weight $M_1$ and the coupled vehicle weight $M_2$, according to the above-described equations (18) and (19). As shown in the equations (18) and (19), the viscosity characteristic $C_F$ and the elastic characteristic $K_F$ of the coupling portion 101 are used to calculate the natural vibration frequency $\omega_t$ and the attenuation coefficient $\zeta_t$ of the longitudinal vibration. The coupling portion 101 is, for example, a genuine part of the electric vehicle 100. Therefore, in the present embodiment, the viscosity characteristic $C_F$ and the elastic characteristic $K_F$ are known according to a design of the coupling portion 101. The natural vibration frequency $\omega_t$ and the attenuation coefficient $\zeta_t$ of the longitudinal vibration are input to the first vibration damping correction processing unit 63.

The first vibration damping correction processing unit 63 calculates the second torque target value $T_{m2}^*$ by correcting the first torque target value $T_{m1}^*$ based on the natural vibration frequency $\omega_t$ and the attenuation coefficient $\zeta_t$ of the longitudinal vibration. The correction processing performed by the first vibration damping correction processing unit 63 is the first vibration damping correction processing for lowering or eliminating the longitudinal vibration component.

The first vibration damping correction processing unit 63 is implemented by, for example, a band-stop filter in which a frequency band (center frequency) for reducing a signal and a gain in the frequency band are variable. The first vibration damping correction processing unit 63 sets the frequency band (center frequency) of the band-stop filter according to the natural vibration frequency $\omega_t$ of the longitudinal vibration. In the present embodiment, as shown in FIG. 8, the center frequency is set to the natural vibration frequency $\omega_t$ of the longitudinal vibration. The first vibration damping correction processing unit 63 sets the gain in the center frequency of the band-stop filter according to the attenuation coefficient $\zeta_t$ of the longitudinal vibration. In the present embodiment, as shown in FIG. 8, the gain for the center frequency (the natural vibration frequency $\omega_t$ of the longitudinal vibration) is set to be smaller as the attenuation coefficient $\zeta_t$ of the longitudinal vibration is smaller. That is, it is set so that the smaller the attenuation coefficient $\zeta_t$ is and the less the attenuation of the longitudinal vibration is, the larger a drop of the gain in the center frequency $\omega_t$ is. Accordingly, the longitudinal vibration is efficiently reduced.

More specifically, the first vibration damping correction processing unit 63 is implemented by, for example, a notch filter, which is one form of the band-stop filter. A transmission characteristic of the notch filter is expressed by the following equation (20). In the equation (20), "$\omega$" is a center frequency, and "$\zeta$" is an attenuation coefficient. "D" is a parameter (hereinafter, simply referred to as a gain D) that defines a drop depth of the gain in the center frequency. Therefore, the first vibration damping correction processing unit 63 sets the center frequency $\omega$ of the notch filter to the natural vibration frequency $\omega_t$ of the longitudinal vibration. The first vibration damping correction processing unit 63 sets the gain D of the notch filter in accordance with the attenuation coefficient $\zeta_t$ of the longitudinal vibration. Note that the attenuation coefficient $\zeta$ of the notch filter is related to a width of the frequency band in which the gain is reduced. The attenuation coefficient $\zeta_t$ of the notch filter is determined in advance based on experiment, simulation, or the like, and is preferably set to at least a value of 1 or more. Even when a band-stop filter other than the notch filter is used, setting thereof is the same as the setting of the notch filter.

[Math. 11]

$$\frac{s^2 + D \cdot 2\zeta\omega s + \omega^2}{s^2 + 2\zeta\omega s + \omega^2} \quad (20)$$

Figure 9:
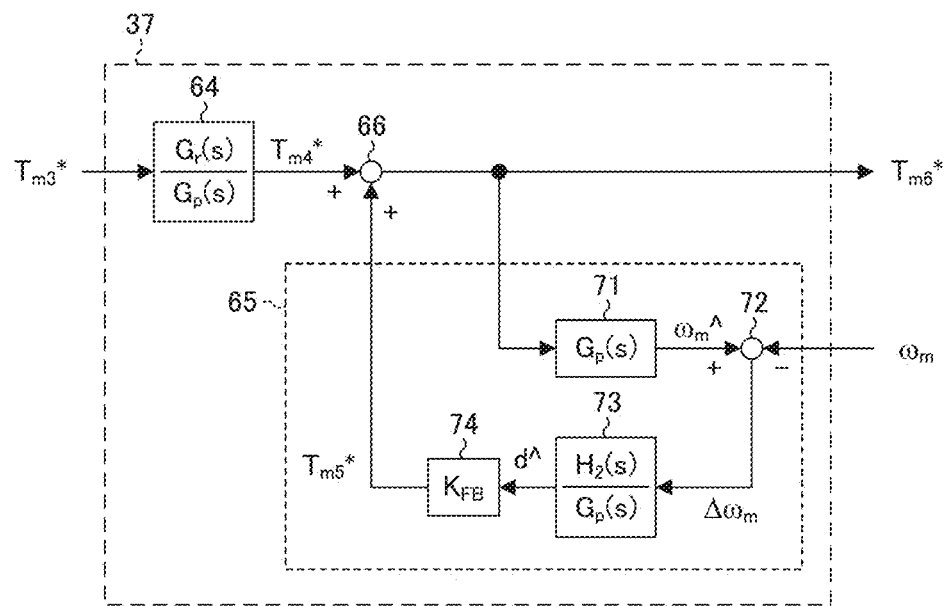
FIG. 9 is a block diagram showing a configuration of a power transmission mechanism vibration damping unit.

FIG. 9 is a block diagram showing a configuration of the power transmission mechanism vibration damping unit 37 (see FIG. 2). As shown in FIG. 9, the power transmission mechanism vibration damping unit 37 includes a feedforward compensation unit 64, a feedback compensation unit 65, and an addition unit 66.

The feedforward compensation unit 64 compensates in advance the power transmission mechanism vibration caused by transmitting the motor torque $T_m$ corresponding to the third torque target value $T_{m3}*$ to the driving wheels 23 through the power transmission mechanism, using the transmission characteristic $G_p(s)$ which is the vehicle model of the electric vehicle 100. That is, the feedforward compensation unit 64 calculates a fourth torque target value $T_{m4}*$ by compensating for a component of the power transmission mechanism vibration included in the third torque target value $T_{m3}*$. The feedforward compensation unit 64 is expressed by a transmission characteristic $G_r(s)/G_p(s)$ constituted by the transmission characteristic $G_p(s)$ which is the vehicle model and a transmission characteristic $G_r(s)$ of a model response. The fourth torque target value $T_{m4}*$, which is a torque target value after the feedforward compensation, is input to the addition unit 66.

The feedback compensation unit 65 compensates for the power transmission mechanism vibration caused by disturbance such as a road surface gradient based on the sixth torque target value $T_{m6}*$ (previous value) serving as the final torque command value and the actual motor rotation speed $\omega_m$. Specifically, the feedback compensation unit 65 includes a motor rotation speed estimation unit 71, a deviation calculation unit 72, a disturbance estimation unit 73, and a gain multiplication unit 74.

The motor rotation speed estimation unit 71 calculates a motor rotation speed estimation value $\omega_m\hat{}$ which is an estimation value of the motor rotation speed $\omega_m$ from the sixth torque target value $T_{m6}*$ by using the transmission characteristic $G_p(s)$ which is the vehicle model of the electric vehicle 100.

The deviation calculation unit 72 calculates a deviation (hereinafter, referred to as a motor rotation speed deviation $\Delta\omega_m$) between the motor rotation speed $\omega_m$, which is a detection value, and the motor rotation speed estimation value $\omega_m\hat{}$. In the present embodiment, the motor rotation speed deviation $\Delta\omega_m$ is calculated by subtracting the motor rotation speed $\omega_m$ from the motor rotation speed estimation value $\omega_m\hat{}$.

The disturbance estimation unit 73 calculates a disturbance estimation value $d\hat{}$ based on the motor rotation speed deviation $\Delta\omega_m$. The disturbance estimation value $d\hat{}$ is an estimation value for the disturbance such as a road surface gradient. The disturbance estimation unit 73 is expressed by, for example, a transmission characteristics $H_2(s)/G_p(s)$. A transmission characteristic $H_2(s)$ is set such that a difference between a denominator order and a numerator order thereof is equal to or larger than a difference between a denominator order and a numerator order of the transmission characteristic $G_p(s)$. The disturbance estimation value $d\hat{}$ is input to the gain multiplication unit 74.

The gain multiplication unit 74 calculates a fifth torque target value $T_{m5}*$ by multiplying the disturbance estimation value $d\hat{}$ by a feedback gain $K_{FB}$. The feedback gain $K_{FB}$ is determined in advance by, for example, experiment, simulation, or the like. The fifth torque target value $T_{m5}*$ represents a compensation amount according to the disturbance with respect to the torque related to the power transmission mechanism vibration caused by the disturbance, that is, the motor torque $T_m$. The fifth torque target value $T_{m5}*$ is input to the addition unit 66.

The addition unit 66 calculates the sixth torque target value $T_{m6}*$ by adding the fourth torque target value $T_{m4}*$, which is a torque target value after the feedforward compensation, to the fifth torque target value $T_{m5}*$, which is a feedback torque. As described above, the sixth torque target value $T_{m6}*$ is a final command value for the motor torque $T_m$.

As described above, the second vibration damping correction processing performed by the power transmission mechanism vibration damping unit 37 includes compensation processing by the feedforward compensation unit 64 and compensation processing by the feedback compensation unit 65.

Figure 10:
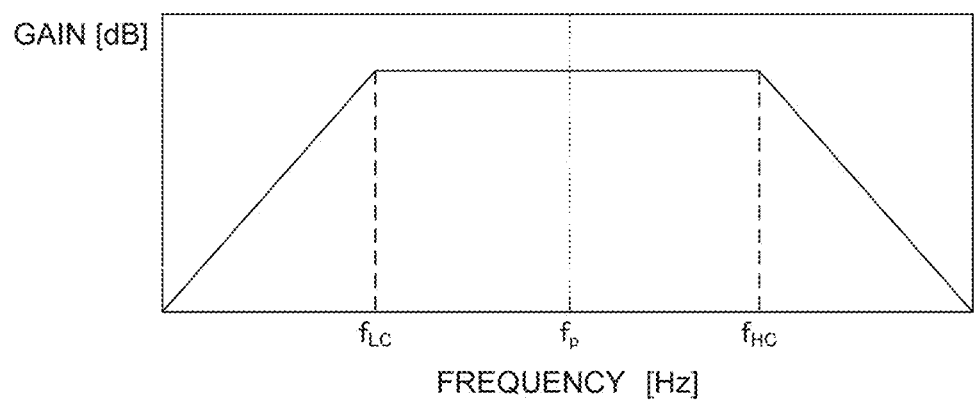
FIG. 10 is a graph showing a transmission characteristic $H_2(s)$ used in a disturbance estimation unit.

Note that FIG. 10 is a graph showing the transmission characteristic $H_2(s)$ used in the disturbance estimation unit 73. As shown in FIG. 10, the transmission characteristic $H_2(s)$ is, for example, a band-pass filter. When the transmission characteristic $H_2(s)$ is a band-pass filter, the feedback compensation unit 65 is a feedback element that selectively reduces a vibration component due to the disturbance. The transmission characteristic $H_2(s)$ is configured such that, for example, an attenuation coefficient on a low-pass side and an attenuation coefficient on a high-pass side substantially coincide with each other. The transmission characteristic $H_2(s)$ is set such that the center frequency $f_p$ of the passing frequency band thereof substantially coincides with a torsional resonance frequency $\omega_p$ of the power transmission mechanism (particularly, the drive shaft 22). Note that the horizontal axis (frequency) in FIG. 10 is a logarithmic scale. Especially, when the transmission characteristic $H_2(s)$ includes a first-order high-pass filter and a first-order low-pass filter, the transmission characteristic $H_2(s)$ is expressed by the following equation (21).

[Math. 12]

$$H_2(s) = \frac{\tau_H s}{(1+\tau_H s)\cdot(1+\tau_L s)} \quad (21)$$

In the equation (21), "$\tau_H$" and "$\tau_L$" are a time constant of the high-pass filter and a time constant of the low-pass filter, respectively. $\tau_L = 1/(2\pi f_{HC})$, $f_{HC} = k \cdot f_p$, $\tau_H = 1/(2\pi f_{LC})$, and $f_{LC} = f_p/k$. Note that "k" is any constant, and "$f_{HC}$" and "$f_{LC}$" are cutoff frequencies on the high-frequency side and the low-frequency side, respectively.

[Configuration of Current Control Processing Unit]

FIG. 11 is a block diagram showing the configuration of the current control processing unit 35 (see FIG. 2). As shown in FIG. 11, the current control processing unit 35 includes a voltage command value calculation unit 81, a coordinate conversion unit 82, a PWM conversion unit 83, and a coordinate conversion unit 84.

The voltage command value calculation unit 81 calculates smoothed non-interference voltages $V_{d\text{-}dcpl\text{-}flt}^*$, $V_{q\text{-}dcpl\text{-}flt}^*$ by processing the non-interference voltages $V_{d\text{-}dcpl}^*$, $V_{q\text{-}dcpl}^*$ with a low-pass filter. Then, the voltage command value calculation unit 81 calculates a d-axis voltage command value $V_d^*$ and a q-axis voltage command value $V_q^*$ (hereinafter referred to as dq-axis voltage command values $V_d^*$, $V_q^*$) by so-called current control calculation based on the dq-axis currents $i_d$, $i_q$, the dq-axis current target values $i_d^*$, $i_q^*$, and the smoothed non-interference voltages $V_{d\text{-}dcpl\text{-}flt}^*$, $V_{q\text{-}dcpl\text{-}flt}^*$. The dq-axis currents $i_d$, $i_q$ are calculated by the coordinate conversion unit 84.

The coordinate conversion unit 82 converts the dq-axis voltage command values $V_d^*$, $V_q^*$ into voltage command values of U, V, and W phases (hereinafter, referred to as three-phase voltage command values $V_u^*$, $V_v^*$, and $V_w^*$) based on the rotor phase θ of the motor 10 according to the following equation (22).

[Math. 13]

$$\begin{bmatrix} V_u^* \\ V_v^* \\ V_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} V_d^* \\ V_q^* \end{bmatrix} \quad (22)$$

The PWM conversion unit 83 generates the PWM signals $D_{uu}^*$, $D_{ul}^*$, $D_{vu}^*$, $D_{vl}^*$, $D_{wu}^*$, and $D_{wl}^*$, which are drive signals of the switching elements in the inverter 12, according to the three-phase voltage command values $V_u^*$, $V_v^*$, and $V_w^*$. When the inverter 12 is driven according to the PWM signals, the motor 10 is controlled to output the motor torque $T_m$ according to the sixth torque target value $T_{m6}^*$.

The coordinate conversion unit 84 calculates the W-phase current $i_w$ based on the U-phase current $i_u$ and the V-phase current $i_v$ detected by the current sensor 24. Then, the coordinate conversion unit 84 converts the currents $i_u$, $i_v$, and $i_w$ into the dq-axis currents $i_d$, $i_q$ using the rotor phase θ of the motor 10 according to the following equation (23). The dq-axis currents $i_d$, $i_q$ are used by the voltage command value calculation unit 81 as described above.

[Math. 14]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (23)$$

Note that the input processing unit 31 includes a motor rotation speed calculation unit 85. The motor rotation speed calculation unit 85 calculates the motor rotation speed $\omega_m$ based on the rotor phase θ of the motor 10.

[Effects]

Hereinafter, effects in a case where the electric vehicle 100 configured as described above including the coupling portion 101 coupled to the coupled vehicle 102 travels while towing the coupled vehicle 102 will be described.

FIGS. 12(A)-12(F) are a time chart showing the longitudinal acceleration $A_{L1}$ and the like during towing traveling. Specifically, in FIG. 12(A) is a time chart of the first torque target value $T_{m1}^*$. In FIG. 12(B) is a time chart of the sixth torque target value $T_{m6}^*$. In FIG. 12(C) is a time chart of the drive shaft torque $T_d$. In FIG. 12(D) is a time chart of the motor rotation speed $\omega_m$. In FIG. 12(E) is a time chart showing the longitudinal acceleration $A_{L1}$ of the electric vehicle 100. In FIG. 12(F) is a time chart showing the longitudinal acceleration $A_{L2}$ of the coupled vehicle 102.

In FIGS. 12(A)-12(F), a solid line indicates an example of a case where the vibration damping control according to the present embodiment is performed, and a broken line indicates an example of a case where vibration damping control according to a comparative example is performed. The comparative example is an example in which the longitudinal vibration damping unit 36 of the vibration damping control unit 33 does not perform the first vibration damping correction processing. However, in the comparative example, the second vibration damping correction processing is still performed by the power transmission mechanism vibration damping unit 37. Therefore, the sixth torque target value $T_{m6}^*$ of the comparative example shown in FIG. 12(B) is the same value as the sixth torque target value $T_{m6}^*$ in a case where the coupled vehicle 102 is not towed in the present embodiment (in a case where $T_{m3}^* = T_{m1}^*$).

As shown in FIG. 12(A), here, it is assumed that the first torque target value $T_{m1}^*$ is input in a step at a time $t_1$ by an accelerator operation of the driver. As shown in FIG. 12(B), after the time $t_1$, at a time $t_2$, the sixth torque target value $T_{m6}^*$ increases to a predetermined torque corresponding to a request by the accelerator operation (accelerator opening $A_{po}$). As shown in FIG. 12(C), the drive shaft torque $T_d$ changes in accordance with the sixth torque target value $T_{m6}^*$. However, in both the present embodiment (solid line) and the comparative example (broken line), the power transmission mechanism vibration is compensated by the second vibration damping correction processing, and therefore, the change in the drive shaft torque $T_d$ is smooth. As shown in FIG. 12(D), the motor rotation speed $\omega_m$ changes in accordance with the change in the sixth torque target value $T_{m6}^*$.

On the other hand, a difference appears in the longitudinal acceleration $A_{L1}$ of the electric vehicle 100 and the longitudinal acceleration $A_{L2}$ of the coupled vehicle 102 between the vibration damping control according to the present embodiment and the vibration damping control of the comparative example. Specifically, as shown in FIG. 12(E) and FIG. 12(F), in the control (broken line) of the comparative example in which the first vibration damping correction processing for reducing the longitudinal vibration due to the towing traveling is not performed, the longitudinal vibration is generated between the electric vehicle 100 and the coupled vehicle 102 due to towing the coupled vehicle 102. As a result, in the control of the comparative example, vibration appears in the longitudinal accelerations $A_{L1}$ and $A_{L2}$ of the electric vehicle 100 and the coupled vehicle 102. The longitudinal vibration continues even after the time $t_2$ when the sixth torque target value $T_{m6}^*$ converges to a torque corresponding to the accelerator opening $A_{po}$. Especially, this longitudinal vibration continues even at a time $t_3$ when a sufficient time elapses after the sixth torque target value $T_{m6}^*$ converges. It indicates that the longitudinal vibration due to towing traveling cannot be sufficiently reduced only by the second vibration damping correction processing for compensating for the power transmission mechanism vibration. In contrast, in the control (solid line) of the present embodiment, the first vibration damping correction processing is performed, and thus the longitudinal vibration between the electric vehicle 100 and the coupled vehicle 102 is reduced. Especially, as shown in FIG. 12(E), even in a transition period (from the time $t_1$ to the time $t_2$) in which the sixth torque target value $T_{m6}^*$ converges to the torque corresponding to the accelerator opening $A_{po}$, a sufficient vibration damping effect of reducing the longitudinal vibration appears. In the control (solid line) of the present embodiment, as shown in FIG. 12(F), the longitudinal vibration of the electric vehicle 100 towing the coupled vehicle 102 is reduced, and the longitudinal vibration of the coupled vehicle 102 which is the towed vehicle is also reduced. As a result, even in the case of towing traveling, the torque required by the vehicle operation can be increased and smooth acceleration can be achieved.

FIGS. 13(A)-13(F) are a time chart showing the longitudinal acceleration $A_{L1}$ and the like when the weight of the coupled vehicle 102 is large. That is, FIGS. 13(A)-13(F) show a case where the weight $M_2$ of the coupled vehicle 102 is larger than that in the case of FIGS. 12(A)-12(F). Parameters shown in FIGS. 13(A)-13(F), differences between the solid line and the broken line, and the like are the same as those in FIGS. 12(A)-12(F).

As shown in FIGS. 13(A)-13(C), even when the weight $M_2$ of the coupled vehicle 102 is large, the changes in the first torque target value $T_{m1}^*$, the sixth torque target value $T_{m6}^*$, and the drive shaft torque $T_d$ are the same as those in FIGS. 12(A) and 12(B). As shown in FIG. 13(D), an increase in the motor rotation speed $\omega_m$ is reduced by an increase in the weight $M_2$ of the coupled vehicle 102, but the increase tendency is the same as that shown in FIG. 12(D).

As shown in FIG. 13(E) and FIG. 13(F), in the control (broken line) of the comparative example, the amplitudes of the vibrations appearing in the longitudinal accelerations $A_{L1}$ and $A_{L2}$ of the electric vehicle 100 and the coupled vehicle 102 are increased as compared with the cases shown in FIG. 12(E) and FIG. 12(F). Frequencies of the vibration appearing in the longitudinal accelerations $A_{L1}$ and $A_{L2}$ are small. Further, the attenuation of the longitudinal vibration is also delayed, and a large longitudinal vibration continues after the time $t_3$. These changes are caused by a change in the characteristic of the longitudinal vibration appearing in the electric vehicle 100 and the coupled vehicle 102, that is, the dynamic characteristics (the natural vibration frequency $\omega_t$ and the attenuation coefficient $\zeta_t$) of the coupling portion 101 to which the coupled vehicle 102 is coupled, which is caused by the increase in the weight $M_2$ of the coupled vehicle 102.

In contrast, in the control (solid line) according to the present embodiment, since the weight $M_2$ of the coupled vehicle 102 is increased, the longitudinal vibration of the electric vehicle 100 and the coupled vehicle 102 are accurately reduced even when the dynamic characteristics are changed as described above.

As described above, in the case where the electric vehicle 100 travels while towing the coupled vehicle 102, unique longitudinal vibration during towing traveling is generated as compared with a case where the electric vehicle 100 travels alone. This longitudinal vibration is caused by a large change in the weight (total weight $M^\frown$) of the entire system and a substantial change in the transmission characteristic of the electric vehicle 100. This longitudinal vibration is not sufficiently reduced only by the vibration damping control (the second vibration damping correction processing) for compensating for the power transmission mechanism vibration.

In the control according to the present embodiment, the first torque target value $T_{m1}^*$ is corrected by the first vibration damping correction processing to calculate the sixth torque target value $T_{m6}^*$ as the final torque command value, and the motor 10 is controlled according to the sixth torque target value $T_{m6}^*$. Accordingly, the unique longitudinal vibration in towing traveling is reduced. In the control according to the present embodiment, the effect of reducing the longitudinal vibration is obtained regardless of the weight $M_2$ of the coupled vehicle 102 which is the towed vehicle. Accordingly, as a result, in the case of towing traveling, regardless of the weight $M_2$ of the coupled vehicle 102, the increase of the torque required by the vehicle operation and the smooth acceleration are achieved.

Second Embodiment

In the first embodiment, the vibration damping control unit 33 includes the longitudinal vibration damping unit 36 and the power transmission mechanism vibration damping unit 37, and the compensation for the longitudinal vibration unique to the towing traveling and the compensation for the power transmission mechanism vibration are separately performed. For example, the vibration damping control unit 33 may be configured to substantially integrally perform the compensation for the longitudinal vibration unique to the towing traveling and the compensation for the power transmission mechanism vibration. Hereinafter, a second embodiment in which the longitudinal vibration damping unit 36 and the feedforward compensation unit 64 (see FIG. 9) which is a part of the power transmission mechanism vibration damping unit 37 are integrally configured will be described as an example.

Figure 14:
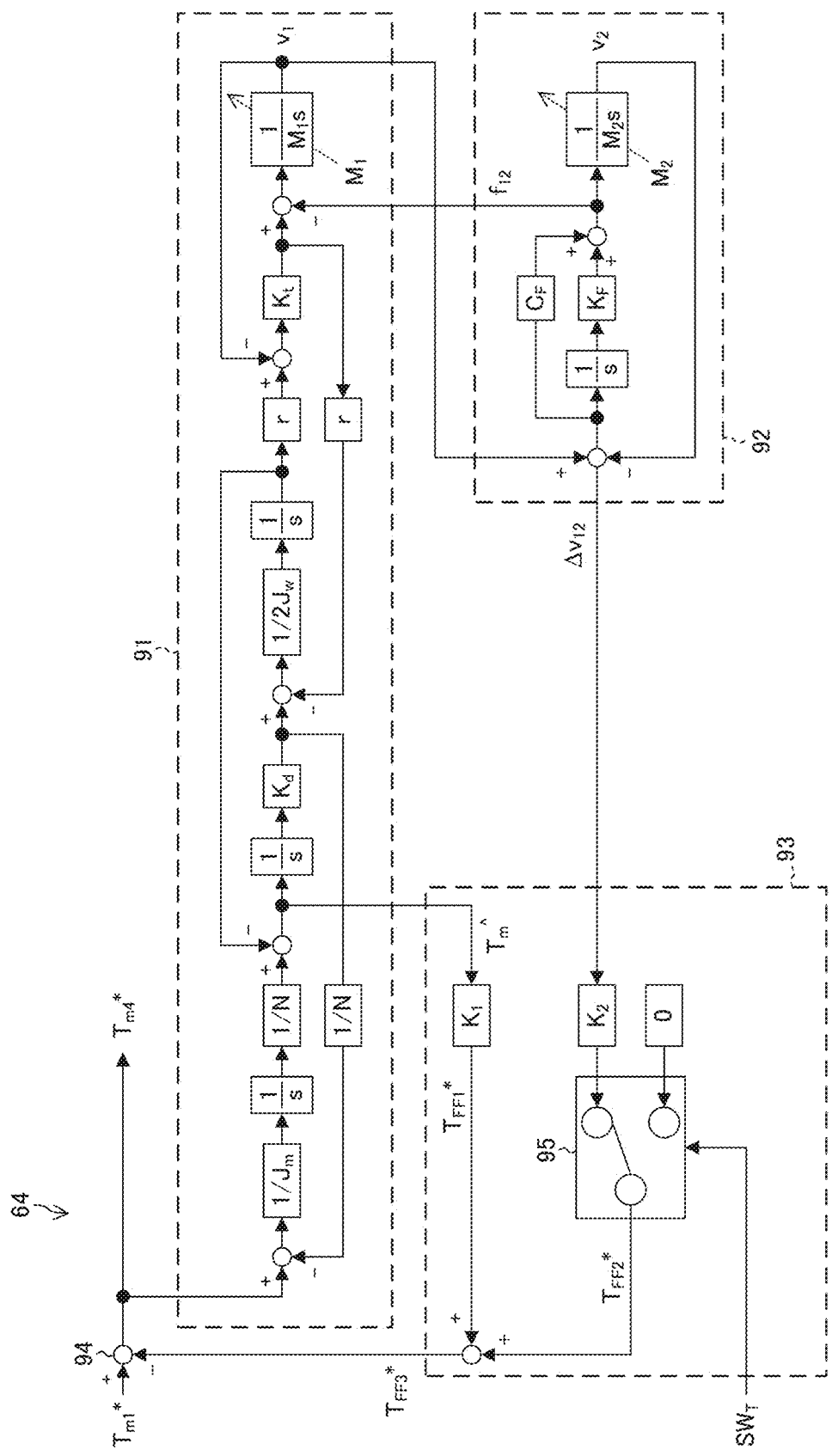
FIG. 14 is a block diagram showing a partial configuration of a vibration damping control unit in a second embodiment.

FIG. 14 is a block diagram showing a partial configuration of the vibration damping control unit 33 in the second embodiment. As shown in FIG. 14, the vibration damping control unit 33 of the second embodiment does not explicitly include the longitudinal vibration damping unit 36 of the first embodiment. Therefore, in the vibration damping control unit 33 of the second embodiment, the feedforward compensation unit 64 is configured to directly calculate the fourth torque target value $T_{m4}^*$ based on the first torque target value $T_{m1}^*$.

This feedforward compensation unit 64 of the second embodiment includes a vehicle model of the electric vehicle 100 (hereinafter referred to as an electric vehicle model 91), a model of the coupled vehicle 102 coupled to the coupling portion 101 (hereinafter referred to as a coupled vehicle model 92), a compensation torque calculation unit 93, and a vibration damping correction processing unit 94.

The electric vehicle model 91 calculates an estimation value of the motor torque $T_m$ corresponding to the fourth torque target value $T_{m4}^*$ (hereinafter, simply referred to as a torque estimation value $T_m\hat{}$) based on the fourth torque target value $T_{m4}^*$ (previous value) output from the feedforward compensation unit 64. Specifically, the electric vehicle model 91 is basically configured in accordance with the equations (2) to (7), which are equations of motion of the electric vehicle 100. The electric vehicle model 91 is configured to calculate the vehicle speed $v_1$ of the electric vehicle 100 using a force $f_{12}$ acting between the electric vehicle 100 and the coupled vehicle 102 based on the equations (8) to (11). In the present embodiment, the force $f_{12}$ is calculated by the coupled vehicle model 92. The weight $M_1$ of the electric vehicle 100 used in the calculation processing of the vehicle speed $v_1$ of the electric vehicle 100 is calculated by the same configuration as that of the electric vehicle weight calculation unit 42 of the first embodiment. That is, the weight $M_1$ of the electric vehicle 100 used in the electric vehicle model 91 is a variable parameter. The torque estimation value $T_m\hat{}$ is input to the compensation torque calculation unit 93. The vehicle speed $v_1$ is input to the coupled vehicle model 92.

The coupled vehicle model 92 is configured to calculate the vehicle speed $v_2$ of the coupled vehicle 102 according to the equations (8) to (11). Specifically, the vehicle speed $v_2$ of the coupled vehicle 102 is calculated based on a deviation between the vehicle speed $v_1$ of the electric vehicle 100 and the vehicle speed $v_2$ of the coupled vehicle 102, that is, a relative vehicle speed $\Delta v_{12}$ between the electric vehicle 100 and the coupled vehicle 102. In the calculation of the relative vehicle speed $\Delta v_{12}$, the vehicle speed $v_1$ of the electric vehicle 100 is acquired from the electric vehicle model 91, and a previous value of a value calculated by the coupled vehicle model 92 is used as the vehicle speed $v_2$ of the coupled vehicle 102.

The viscosity characteristic $C_F$ and the elastic characteristic $K_F$, which are the mechanical characteristics of the coupling portion 101, are used to calculate the vehicle speed $v_2$ of the coupled vehicle 102. Accordingly, the dynamic characteristic of the coupling portion 101 to which the coupled vehicle 102 is coupled is substantially reflected in the value of the vehicle speed $v_2$ of the coupled vehicle 102. The weight $M_2$ of the coupled vehicle 102 used in the calculation processing the vehicle speed $v_2$ of the coupled vehicle 102 is calculated by the same configurations as the electric vehicle weight calculation unit 42, the total weight calculation unit 41, and the coupled vehicle weight calculation unit 43 of the first embodiment. That is, the weight $M_2$ of the coupled vehicle 102 used in the coupled vehicle model 92 is a variable parameter. The force $f_{12}$ calculated in the calculation processing of the vehicle speed $v_2$ is input to the electric vehicle model 91. The relative vehicle speed $\Delta v_{12}$ is input to the compensation torque calculation unit 93. Note that the relative vehicle speed $\Delta v_{12}$ substantially reflects the dynamic characteristic of the coupling portion 101 to which the coupled vehicle 102 is coupled via the vehicle speed $v_2$ of the coupled vehicle 102.

The compensation torque calculation unit 93 calculates a first compensation torque $T_{FF1}^*$ by multiplying the torque estimation value $T_m\hat{}$ by a predetermined gain $K_1$ determined in advance by experiment, simulation, or the like. The first compensation torque $T_{FF1}^*$ compensates for the torque corresponding to the power transmission mechanism vibration in advance.

The compensation torque calculation unit 93 calculates a second compensation torque $T_{FF2}^*$ based on the relative vehicle speed $\Delta v_{12}$. The second compensation torque $T_{FF2}^*$ compensates in advance for the torque corresponding to the longitudinal vibration caused by the coupled vehicle 102 being coupled to the coupling portion 101. More specifically, when the coupled vehicle 102 is coupled to the coupling portion 101, the compensation torque calculation unit 93 sets a value obtained by multiplying the relative vehicle speed $\Delta v_{12}$ by a predetermined gain $K_2$ determined in advance by experiment, simulation, or the like as the second compensation torque $T_{FF2}^*$. On the other hand, when the coupled vehicle 102 is not coupled to the coupling portion 101, the compensation torque calculation unit 93 sets zero ("0"), which is a fixed value, as the second compensation torque $T_{FF2}^*$.

The switching of the second compensation torque $T_{FF2}^*$ is performed by a second compensation torque switching unit 95 based on the towing traveling signal $SW_T$. That is, when the second compensation torque switching unit 95 determines that the coupled vehicle 102 is coupled to the coupling portion 101 based on the towing traveling signal $SW_T$, the second compensation torque $T_{FF2}^*$ becomes a value based on the relative vehicle speed $\Delta v_{12}$. On the other hand, when the second compensation torque switching unit 95 determines that the coupled vehicle 102 is not coupled to the coupling portion 101 based on the towing traveling signal $SW_T$, the second compensation torque $T_{FF2}^*$ is set to zero.

The compensation torque calculation unit 93 calculates a third compensation torque $T_{FF3}^*$ by adding up the first compensation torque $T_{FF1}^*$ and the second compensation torque $T_{FF2}^*$ calculated as described above. Therefore, the third compensation torque $T_{FF3}^*$ is, in principle, a torque for compensating in advance for the power transmission mechanism vibration, but when the coupled vehicle 102 is coupled to the coupling portion 101, the third compensation torque $T_{FF3}^*$ further includes a torque for compensating in advance for the longitudinal vibration unique to the towing traveling. The third compensation torque $T_{FF3}^*$ is input to the vibration damping correction processing unit 94.

The vibration damping correction processing unit 94 calculates the fourth torque target value $T_{m4}^*$ by correcting the first torque target value $T_{m1}^*$ using the third compensation torque $T_{FF3}^*$. When the coupled vehicle 102 is coupled to the coupling portion 101, the correction processing performed by the vibration damping correction processing unit 94 substantially includes the first vibration damping correction processing and the correction processing including the feedforward compensation of the first embodiment. Therefore, the fourth torque target value $T_{m4}^*$ calculated by the vibration damping correction processing unit 94 is substantially the same as the fourth torque target value $T_{m4}^*$ output by the feedforward compensation unit 64 of the first embodiment. Therefore, similarly to the first embodiment, the fourth torque target value $T_{m4}^*$ becomes the sixth torque target value $T_{m6}*$ by the feedback compensation unit 65 and the addition unit 66, and is used as the final torque command value.

As described above, the longitudinal vibration damping unit 36 and the feedforward compensation unit 64 of the first embodiment can be integrally configured. Since the fourth torque target value $T_{m4}*$ output by the feedforward compensation unit 64 of the second embodiment in which the above two units are integrated is substantially the same as the fourth torque target value $T_{m4}*$ of the first embodiment, as described above, even when the longitudinal vibration damping unit 36 and the feedforward compensation unit 64 of the first embodiment are integrated, the same functions and effects as those of the first embodiment can be achieved (see FIGS. 12(A)-(F) and 13(A)-(F)).

Note that the feedforward compensation unit 64 of the second embodiment substantially performs the vibration damping control based on the transmission characteristic from the input of the first torque target value $T_{m1}*$ to the output of the fourth torque target value $T_{m4}*$. The electric vehicle weight $M_1$ and the coupled vehicle weight $M_2$ constituting the transmission characteristic are variable parameters, and the content of the second compensation torque $T_{FF2}*$ is switched depending on the presence or absence of the coupled vehicle 102. Accordingly, the control according to the second embodiment is configured to reduce the longitudinal vibration unique to the towing traveling by changing (adjusting) the content of the transmission characteristic depending on whether the coupled vehicle 102 is coupled to the coupling portion 101.

Third Embodiment

In the first embodiment and the second embodiment, it is assumed that the elastic characteristic $K_F$ and the viscosity characteristic $C_F$, which are the mechanical characteristics of the coupling portion 101, are known, and an error (modeling error) included in the transmission characteristic $G_p(s)$, which is the vehicle model of the electric vehicle 100, is sufficiently small to an ignorable extent. However, more practically, errors of the elastic characteristic $K_F$ and the viscosity characteristic $C_F$ of the coupling portion 101 may not be ignorable when, for example, a trailer hitch manufactured by a third party is used. The elastic characteristic $K_F$ or the viscosity characteristic $C_F$ of the coupling portion 101 may change due to a change over time, and an error may occur. Depending on an actual situation of towing traveling, a modeling error of the transmission characteristic $G_p(s)$ and the like may not be ignored. In such a situation, even if the correction processing for reducing the longitudinal vibration in the first embodiment or the second embodiment is performed, the longitudinal vibration may still be generated. In the present third embodiment, a configuration in which the longitudinal vibration can be suitably reduced regardless of an error included in the known values such as the elastic characteristic $K_F$ and the viscosity characteristic $C_F$ of the coupling portion 101 or a modeling error will be described.

Figure 15:
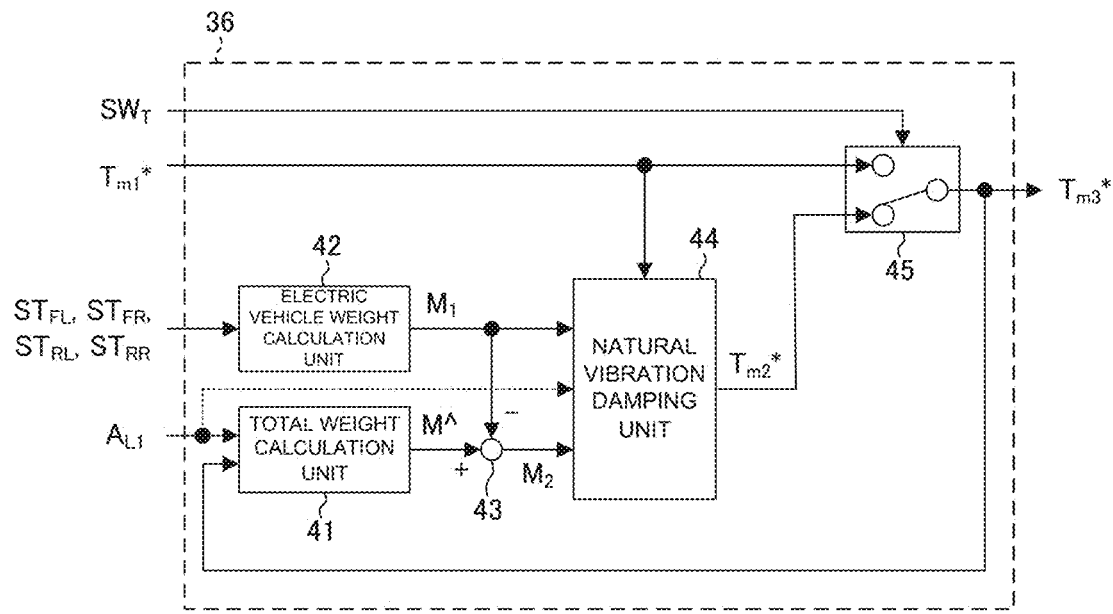
FIG. 15 is a block diagram showing a configuration of the longitudinal vibration damping unit in a third embodiment.

FIG. 15 is a block diagram showing a configuration of the longitudinal vibration damping unit 36 in the third embodiment. As shown in FIG. 15, in the longitudinal vibration damping unit 36 of the present third embodiment, the longitudinal acceleration $A_{L1}$ is input to the natural vibration damping unit 44. The natural vibration damping unit 44 performs the first vibration damping correction processing on the first torque target value $T_{m1}*$ using the longitudinal acceleration $A_{L1}$ in addition to the electric vehicle weight $M_1$, the coupled vehicle weight $M_2$, and the viscosity characteristic $C_F$ and the elastic characteristic $K_F$ which are the mechanical characteristics of the coupling portion 101. The other configurations are the same as those of the longitudinal vibration damping unit 36 of the first embodiment.

Figure 16:
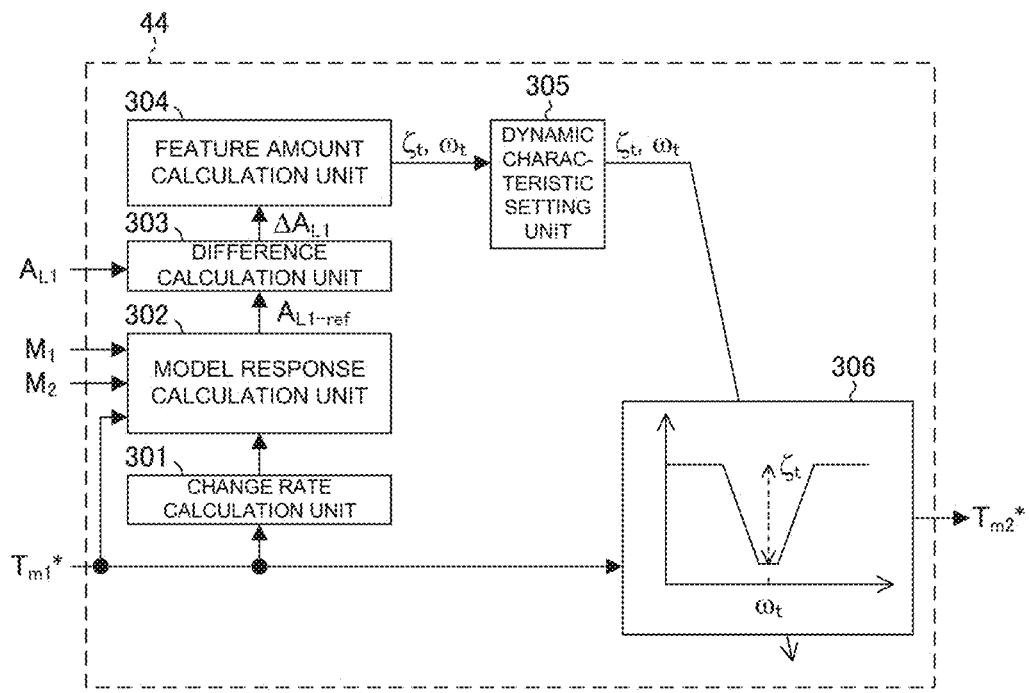
FIG. 16 is a block diagram showing a configuration of the natural vibration damping unit in the third embodiment.

FIG. 16 is a block diagram showing a configuration of the natural vibration damping unit 44 according to the third embodiment. As shown in FIG. 16, the natural vibration damping unit 44 of the present third embodiment includes a change rate calculation unit 301, a model response calculation unit 302, a difference calculation unit 303, a feature amount calculation unit 304, a dynamic characteristic setting unit 305, and a first vibration damping correction processing unit 306.

The change rate calculation unit 301 calculates a change rate of the motor torque $T_m$ or a parameter corresponding to the change rate of the motor torque $T_m$. In this way, the change rate calculation unit 301 determines a traveling scene in which the longitudinal vibration is likely to occur.

In the present embodiment, the change rate calculation unit 301 calculates a change amount of the first torque target value $T_{m1}*$ in a predetermined time (for example, one control cycle), that is, a time change rate of the first torque target value $T_{m1}*$ (hereinafter, simply referred to as a change rate $\delta T_{m1}*$ of the first torque target value $T_{m1}*$). More specifically, the change rate calculation unit 301 holds a previous value $T_{m1z}*$ (not shown) of the first torque target value $T_{m1}*$. Therefore, the change rate calculation unit 301 calculates the change rate $\delta T_{m1}*$ of the first torque target value $T_{m1}*$ by comparing a current value of the first torque target value $T_{m1}*$ and the previous value $T_{m1z}*$, or by calculating a difference between the current value of the first torque target value $T_{m1}*$ and the previous value $T_{m1z}*$. The change rate $\delta T_{m1}*$ of the first torque target value $T_{m1}*$ is a parameter substantially representing the change rate (time change rate) of the motor torque $T_m$.

Then, the change rate calculation unit 301 determines a traveling scene in which the longitudinal vibration is likely to occur based on the change rate $\delta T_{m1}*$ of the first torque target value $T_{m1}*$. Specifically, as the change rate $\delta T_{m1}*$ of the first torque target value $T_{m1}*$ increases, the longitudinal vibration is more likely to occur. In the case where the change rate $\delta T_{m1}*$ of the first torque target value $T_{m1}*$ is large, when there is an error in the elastic characteristic $K_F$ or the viscosity characteristic $C_F$, or a modeling error, the longitudinal vibration is likely to remain even if the correction processing for reducing the longitudinal vibration in the first embodiment or the second embodiment is performed. Therefore, in the present embodiment, the change rate calculation unit 301 compares the change rate $\delta T_{m1}*$ of the first torque target value $T_{m1}*$ with a change rate threshold value $\delta T_{TH}$, and determines the traveling scene in which the longitudinal vibration is likely to occur when the change rate $\delta T_{m1}*$ of the first torque target value $T_{m1}*$ is larger than the change rate threshold value $\delta T_{TH}$. The change rate threshold value $\delta T_{TH}$ is set in advance based on experiment, simulation, or the like with respect to the change rate $\delta T_{m1}*$ of the first torque target value $T_{m1}*$.

The change rate calculation unit 301 sets a dynamic characteristic calculation flag FLG according to a comparison result between the change rate $\delta T_{m1}*$ of the first torque target value $T_{m1}*$ and the change rate threshold value $\delta T_{TH}$. The dynamic characteristic calculation flag FLG is an index indicating new calculation of the natural vibration frequency $\omega_t$ and the attenuation coefficient $\zeta_t$ (to identify the dynamic characteristic of the coupling portion 101) based on the longitudinal acceleration $A_{L1}$ and the like. The dynamic characteristic calculation flag FLG is set to, for example, "1" or "0", and when the flag FLG is "1", the natural vibration frequency $\omega_t$ and the attenuation coefficient $\zeta_t$ are calculated based on the longitudinal acceleration $A_{L1}$ and the like. On the other hand, when the flag FLG is "0", the natural vibration frequency $\omega_t$ and the attenuation coefficient $\zeta_t$ are not calculated, and the previous value continues to be used. The change rate calculation unit 301 sets the dynamic characteristic calculation flag FLG to "1" when the change rate $\delta_{Tm1}*$ of the first torque target value $T_{m1}*$ is larger than the change rate threshold value $\delta T_{TH}$. On the other hand, the change rate calculation unit 301 sets the dynamic characteristic calculation flag FLG to "0" when the change rate $\delta_{Tm1}*$ of the first torque target value $T_{m1}*$ is equal to or less than the change rate threshold value $\delta T_{TH}$. The change rate calculation unit 301 inputs the dynamic characteristic calculation flag FLG to, for example, the model response calculation unit 302.

The model response calculation unit 302 calculates a model response $A_{L1\text{-}ref}$ of the longitudinal acceleration $A_{L1}$ in the traveling scene in which at least the longitudinal vibration is likely to occur. In the present embodiment, the model response calculation unit 302 calculates the model response $A_{L1\text{-}ref}$ of the longitudinal acceleration $A_{L1}$ when the dynamic characteristic calculation flag FLG is "1".

The model response calculation unit 302 calculates the model response $A_{L1\text{-}ref}$ of the longitudinal acceleration $A_{L1}$ based on the electric vehicle weight $M_1$, the coupled vehicle weight $M_2$, and the first torque target value $T_{m1}*$. Specifically, the model response calculation unit 302 calculates the model response $A_{L1\text{-}ref}$ of the longitudinal acceleration $A_{L1}$ according to the following equation (25) by applying a model transmission characteristic $G_{pF\text{-}ref}(s)$ expressed by the following equation (24) to the first torque target value $T_{m1}*$. The model response $A_{L1\text{-}ref}$ of the longitudinal acceleration $A_{L1}$ is input to the difference calculation unit 303.

[Math. 15]

$$G_{pF-ref}(s) = \frac{c_0}{(s+\alpha)\cdot(s^2 + 2\omega_p s + \omega_p^2)} \quad (24)$$

$$A_{L1-ref} = \frac{1}{M} \cdot G_{pF-ref}(s) \cdot T_{m1}^* \quad (25)$$

Note that the model transmission characteristic $G_{pF\text{-}ref}(s)$ represents a model response from the motor torque $T_m$ to the driving force F. The model transmission characteristic $G_{pF\text{-}ref}(s)$ is obtained by setting $\zeta_p$ to 1 in the transmission characteristic $G_{pF}(s)$ of the equation (17) as expressed by the equation (24). In the equation (25), "M" is a total weight of the electric vehicle 100 and the coupled vehicle 102 (=$M_1$+$M_2$). Except that the model transmission characteristic $G_{pF\text{-}ref}(s)$ is used instead of the transmission characteristic $G_pF(s)$, the model response $A_{L1\text{-}ref}$ of the longitudinal acceleration $A_{L1}$ is calculated in the same manner as the longitudinal acceleration estimation value $A_{L1}\hat{}$, and therefore the model response $A_{L1\text{-}ref}$ of the longitudinal acceleration $A_{L1}$ is an estimation value. The above-described calculation method for the model response $A_{L1\text{-}ref}$ of the longitudinal acceleration $A_{L1}$ is an example, and the model response $A_{L1\text{-}ref}$ of the longitudinal acceleration $A_{L1}$ can be calculated using, for example, the vehicle model expressed by the above-described equation (19).

The difference calculation unit 303 calculates a difference $\Delta A_{L1}$ between the longitudinal acceleration $A_{L1}$, which is an actual response, and the model response $A_{L1\text{-}ref}$. In the present embodiment, the difference calculation unit 303 calculates the difference $\Delta A_{L1}$ by subtracting the model response $A_{L1\text{-}ref}$ from the longitudinal acceleration $A_{L1}$, which is the actual response. After the dynamic characteristic calculation flag FLG becomes "1", the difference calculation unit 303 continuously calculates the difference $\Delta A_{L1}$ in at least a predetermined period PP. That is, the difference $\Delta A_{L1}$ constitutes a data row that can change over time. The difference $\Delta A_{L1}$ calculated by the difference calculation unit 303 is input to the feature amount calculation unit 304. Note that the "predetermined period PP" in which the difference $\Delta A_{L1}$ is calculated is a time interval to the extent that time series data of the difference $\Delta A_{L1}$ can be acquired to the extent that frequency analysis can be performed, and is determined in advance as, for example, from about 1 to several seconds by experiment, simulation, or the like. When a frequency range of the longitudinal vibration that may occur is identified by experiment, simulation, or the like, the difference calculation unit 303 can perform filtering processing of extracting components in the identified frequency range on the output difference $\Delta A_{L1}$. In this case, noise superimposed on the difference $\Delta A_{L1}$ (for example, noise corresponding to disturbance or the like) is removed, thereby improving accuracy of reducing the longitudinal vibration.

The feature amount calculation unit 304 identifies the dynamic characteristic of the coupling portion 101 to which the coupled vehicle 102 is coupled by calculating feature amounts of the longitudinal vibration generated by the coupled vehicle 102 being coupled to the coupling portion 101. In the present embodiment, the feature amount calculation unit 304 calculates the natural vibration frequency $\omega_t$ and the attenuation coefficient $\zeta_t$, which are the feature amounts of the longitudinal vibration, based on the difference $\Delta A_{L1}$ between the longitudinal acceleration $A_{L1}$, which is the actual response, and the model response $A_{L1\text{-}ref}$. That is, the feature amount calculation unit 304 holds the difference $\Delta A_{L1}$ in the predetermined period PP, and calculates the natural vibration frequency $\omega_t$ and the attenuation coefficient $\zeta_t$ based on the time series data. The feature amount calculation unit 304 can calculate the natural vibration frequency $\omega_t$ and the attenuation coefficient $\zeta_t$ by performing frequency analysis such as FFT (Fast Fourier Transform) on the time series data of the difference $\Delta A_{L1}$. In the present embodiment, the feature amount calculation unit 304 simply calculates the natural vibration frequency $\omega_t$ and the attenuation coefficient $\zeta_t$ based on the number of peaks (or bottoms) formed by the difference $\Delta A_{L1}$ in the predetermined period PP and the change in amplitude thereof.

As described above, the feature amount calculation unit 304 does not use the viscosity characteristic $C_F$ and the elastic characteristic $K_F$ of the coupling portion 101 for calculating the natural vibration frequency $\omega_t$ and the attenuation coefficient $\zeta_t$. That is, the feature amount calculation unit 304 identifies the dynamic characteristic of the coupling portion 101 by calculating the natural vibration frequency $\omega_t$ and the attenuation coefficient $\zeta_t$, which are feature amounts of the longitudinal vibration by a method different from that of the feature amount calculation unit 62 of the first embodiment. The natural vibration frequency $\omega_t$ and the attenuation coefficient $\zeta_t$ calculated by the feature amount calculation unit 304 are input to the dynamic characteristic setting unit 305.

Note that in the present embodiment, the feature amount calculation unit 304 compares the difference $\Delta A_{L1}$ with an acceleration threshold value $\Delta A_{TH}$. When the difference $\Delta A_{L1}$ is larger than the acceleration threshold value $\Delta A_{TH}$, the feature amount calculation unit 304 holds the time series data of the difference $\Delta A_{L1}$ and calculates the natural vibration frequency $\omega_t$ and the attenuation coefficient $\zeta_t$ based on the time series data of the difference $\Delta A_L 1$. That is, when the amplitude of the difference $\Delta A_{L1}$ is entirely or partially larger than the amplitude determined by the acceleration threshold value $\Delta A_{TH}$ and a non-ignorable longitudinal vibration occurs, the feature amount calculation unit 304 calculates a new natural vibration frequency $\omega_t$ and a new attenuation coefficient $\zeta_t$ based on the time series data of the difference $\Delta A_{L1}$. On the other hand, when the amplitude of the difference $\Delta A_{L1}$ is equal to or less than the acceleration threshold value $\Delta A_{TH}$ in the entire range of the predetermined period PP, the feature amount calculation unit 304 determines that the scene is a scene in which longitudinal vibration, even if it occurs, can be substantially ignored. Then, the feature amount calculation unit 304 sets (resets) the dynamic characteristic calculation flag FLG to "0", and does not calculate a new natural vibration frequency $\omega_t$ and the attenuation coefficient $\zeta_t$ based on the difference $\Delta A_{L1}$. The acceleration threshold value $\Delta A_{TH}$ is determined in advance by experiment, simulation, or the like.

The dynamic characteristic setting unit 305 sets the natural vibration frequency $\omega_t$ and the attenuation coefficient $\zeta_t$ to be finally used as the dynamic characteristic of the coupling portion 101 by the first vibration damping correction processing unit 306.

In the present embodiment, an initial value $\omega_{t0}$ (not shown) of the natural vibration frequency $\omega_t$ and an initial value $\zeta_{t0}$ (not shown) of the attenuation coefficient $\zeta_t$ are determined in advance. Therefore, when the dynamic characteristic calculation flag FLG does not become "1" and the feature amount calculation unit 304 does not newly calculate the natural vibration frequency $\omega_t$ and the attenuation coefficient $\zeta_t$, the dynamic characteristic setting unit 305 sets the initial values $\omega_{t0}$ and $\zeta_{t0}$ as the natural vibration frequency $\omega_t$ and the attenuation coefficient $\zeta_t$ to be finally used as the dynamic characteristics of the coupling portion 101. The initial values $\omega_{t0}$ and $\zeta_{t0}$ are set based on, for example, the viscosity characteristic $C_F$ and the elastic characteristic $K_F$ of the coupling portion 101 and the vehicle model of the electric vehicle 100.

On the other hand, when the feature amount calculation unit 304 newly calculates the natural vibration frequency $\omega_t$ and the attenuation coefficient $\zeta_t$ based on the difference $\Delta A_{L1}$ between the longitudinal acceleration $A_{L1}$, which is the actual response, and the model response $A_{L1\text{-}ref}$, the dynamic characteristic setting unit 305 compares the newly calculated natural vibration frequency $\omega_t$ and the attenuation coefficient $\zeta_t$ with existing constants. The existing constants are the natural vibration frequency $\omega_t$ and the attenuation coefficient $\zeta_t$ that are already used as the dynamic characteristics of the coupling portion 101, and are, for example, previous values $\omega_{tz}$ and $\zeta_{tz}$ (not shown). The previous values $\omega_{tz}$ and $\zeta_{tz}$ of the natural vibration frequency $\omega_t$ and the attenuation coefficient $\zeta_t$ are, for example, the initial values $\omega_{t0}$ and $\zeta_{t0}$.

More specifically, the dynamic characteristic setting unit 305 calculates a frequency deviation $\delta\omega_t$, which is a deviation between the natural vibration frequency $\omega_t$ newly calculated by the feature amount calculation unit 304 and the previous value $\omega_{tz}$ of the natural vibration frequency $\omega_t$, and compares the calculated frequency deviation with a frequency threshold value $\delta\omega_{TH}$. The frequency threshold value $\delta\omega_{TH}$ is determined in advance by experiment, simulation, or the like. When the frequency deviation $\delta\omega_t$ is larger than the frequency threshold value $\delta\omega_{TH}$, the dynamic characteristic setting unit 305 updates the natural vibration frequency $\omega_t$ used as the dynamic characteristic of the coupling portion 101 to the natural vibration frequency $\omega_t$ newly calculated by the feature amount calculation unit 304. On the other hand, when the frequency deviation $\delta\omega_t$ is equal to or less than the frequency threshold value $\delta\omega_{TH}$, the dynamic characteristic setting unit 305 holds the natural vibration frequency $\omega_t$ used as the dynamic characteristic of the coupling portion 101 at the previous value $\omega_{tz}$. That is, the dynamic characteristic setting unit 305 updates the natural vibration frequency $\omega_t$ when the natural vibration frequency $\omega_t$ deviates from an existing constant by a predetermined degree or more.

Similarly, the dynamic characteristic setting unit 305 calculates an attenuation coefficient deviation $\delta\zeta_t$, which is a deviation between the attenuation coefficient $\zeta_t$ newly calculated by the feature amount calculation unit 304 and the previous value $\zeta_{tz}$ of the attenuation coefficient $\zeta_t$, and compares the attenuation coefficient deviation $\delta\zeta_t$ with the attenuation coefficient threshold value $\delta\zeta_{TH}$. The attenuation coefficient threshold value $\delta\zeta_{TH}$ is determined in advance by experiment, simulation, or the like. When the attenuation coefficient deviation $\delta\zeta_t$ is larger than the attenuation coefficient threshold value $\delta\zeta_{TH}$, the dynamic characteristic setting unit 305 updates the attenuation coefficient $\zeta_t$ used as the dynamic characteristic of the coupling portion 101 to the attenuation coefficient $\zeta_t$ newly calculated by the feature amount calculation unit 304. On the other hand, when the attenuation coefficient deviation $\delta\zeta_t$ is equal to or less than the attenuation coefficient threshold value $\delta\zeta_{TH}$, the dynamic characteristic setting unit 305 holds the attenuation coefficient $\zeta_t$ used as the dynamic characteristic of the coupling portion 101 at the previous value $\zeta_{tz}$. That is, the dynamic characteristic setting unit 305 updates the attenuation coefficient $\zeta_t$ when the attenuation coefficient $\zeta_t$ deviates from an existing constant by a predetermined degree or more. Note that the natural vibration frequency $\omega_t$ and the attenuation coefficient $\zeta_t$ can be updated or held independently of each other.

Note that the dynamic characteristic setting unit 305 limits the range of the natural vibration frequency $\omega_t$ that can be set. Specifically, the dynamic characteristic setting unit 305 defines an upper limit and a lower limit for the natural vibration frequency $\omega_t$, and updates or holds the natural vibration frequency $\omega_t$ within a range between the upper limit and the lower limit. The upper limit and the lower limit of the natural vibration frequency $\omega_t$ determine a range of the natural vibration frequency $\omega_t$ that can be actually taken in towing traveling, and are determined in advance by experiment, simulation, or the like. Similarly, the dynamic characteristic setting unit 305 limits the range of the attenuation coefficient $\zeta_t$ that can be set. Specifically, the dynamic characteristic setting unit 305 determines an upper limit and a lower limit for the attenuation coefficient $\zeta_t$, and updates or holds the attenuation coefficient $\zeta_t$ within a range between the upper limit and the lower limit. The upper limit and the lower limit of the attenuation coefficient $\zeta_t$ determine a range of the attenuation coefficient $\zeta_t$ that can be actually taken in towing traveling, and are determined in advance by experiment, simulation, or the like. In this way, the dynamic characteristic setting unit 305 limits the ranges of the natural vibration frequency $\omega_t$ and the attenuation coefficient $\zeta_t$ that can be set to realistic ranges. Accordingly, even if there is an estimation error in the natural vibration frequency $\omega_t$ and the attenuation coefficient $\zeta_t$ by the feature amount calculation unit 304, the behavior of the electric vehicle 100 does not become an unexpected unstable behavior due to the estimation error.

The first vibration damping correction processing unit 306 has the same configuration as the first vibration damping correction processing unit 63 (see FIG. 8) of the first embodiment except that the natural vibration frequency $\omega_t$ and the attenuation coefficient $\zeta_t$ are set by the dynamic characteristic setting unit 305. That is, the first vibration damping correction processing unit 306 calculates the second torque target value $T_{m2}{}^*$ by correcting the first torque target value $T_{m1}{}^*$ based on the natural vibration frequency $\omega_t$ and the attenuation coefficient $\zeta_t$ set by the dynamic characteristic setting unit 305.

Hereinafter, functions of setting the natural vibration frequency $\omega_t$ and the like in the electric vehicle 100 of the third embodiment configured as described above will be described.

Figure 17:
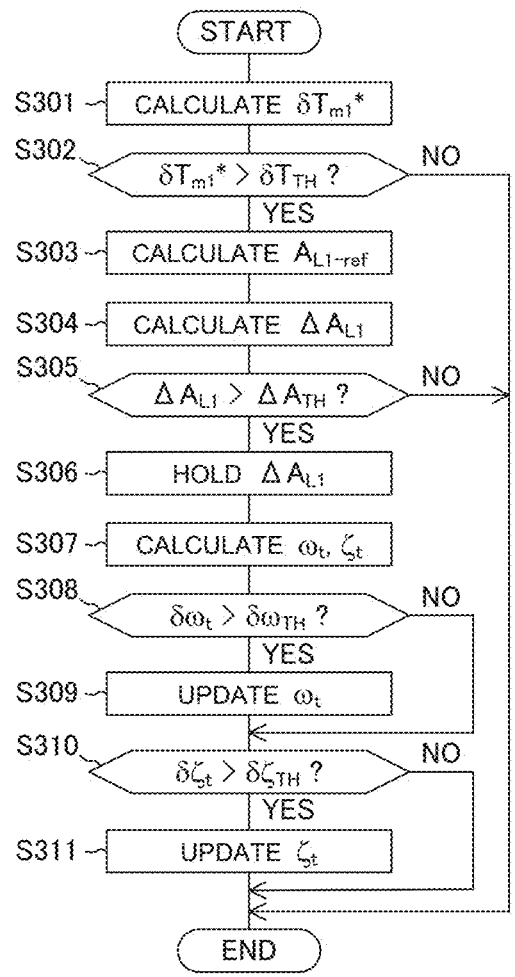

FIG. 17 is a flowchart related to the updating of the natural vibration frequency and the like. As shown in FIG. 17, in step S301, the change rate calculation unit 301 calculates the change rate $\delta T_{m1}{}^*$ of the first torque target value $T_{m1}{}^*$. In step S302, the change rate calculation unit 301 compares the change rate $\delta T_{m1}{}^*$ of the first torque target value $T_{m1}{}^*$ with the change rate threshold value $\delta T_{TH}$, and sets the dynamic characteristic calculation flag FLG.

In step S302, when the change rate $\delta T_{m1}{}^*$ of the first torque target value $T_{m1}{}^*$ is larger than the change rate threshold value $\delta T_{TH}$, the dynamic characteristic calculation flag FLG is set to "1", and the process proceeds to step S303. This is a traveling scene in which there is a high possibility of occurrence of longitudinal vibration during towing traveling. On the other hand, in step S302, when the change rate $\delta T_{m1}{}^*$ of the first torque target value $T_{m1}{}^*$ is equal to or less than the change rate threshold value $\delta T_{TH}$, the natural vibration frequency $\omega_t$ and the attenuation coefficient $\zeta_t$ are held at the previous values $\omega_{tz}$ and $\zeta_{tz}$ and the update processing shown in this flowchart is ended. This is a traveling scene in which the longitudinal vibration is unlikely to occur in towing traveling.

In step S303, the model response calculation unit 302 calculates the model response $A_{L1\text{-}ref}$ of the longitudinal acceleration $A_{L1}$ based on the electric vehicle weight $M_1$, the coupled vehicle weight $M_2$, and the first torque target value $T_{m1}{}^*$. In step S304, the difference calculation unit 303 calculates the difference $\Delta A_{L1}$ between the longitudinal acceleration $A_{L1}$, which is an actual response, and the model response $A_{L1\text{-}ref}$. In step S305, the feature amount calculation unit 304 compares the difference $\Delta A_{L1}$ with the acceleration threshold value $\Delta A_{TH}$, and determines whether non-ignorable longitudinal vibration occurs.

In step S305, when the difference $\Delta A_{L1}$ is equal to or less than the acceleration threshold value $\Delta A_{TH}$ and the generated longitudinal vibration is ignorable, the natural vibration frequency $\omega_t$ and the attenuation coefficient $\zeta_t$ are held at the previous values $\omega_{tz}$ and $\zeta_{tz}$ and the update processing shown in this flowchart is ended.

On the other hand, in step S305, when the difference $\Delta A_{L1}$ is larger than the acceleration threshold value $\Delta A_{TH}$, the process proceeds to step S306, and the feature amount calculation unit 304 holds the difference $\Delta A_{L1}$ in the predetermined period PP. Then, in step S307, the feature amount calculation unit 304 calculates a new natural vibration frequency $\omega_t$ and a new attenuation coefficient $\zeta_t$ based on the time series data of the held difference $\Delta A_{L1}$.

Then, in step S308, the dynamic characteristic setting unit 305 calculates the frequency deviation $\delta\omega_t$, which is a deviation between the current value of the natural vibration frequency $\omega_t$ calculated by the feature amount calculation unit 304 and the previous value $\omega_{tz}$ of the natural vibration frequency $\omega_t$, and compares the calculated frequency deviation with the frequency threshold value $\delta\omega_{TH}$. In step S308, when it is determined that the frequency deviation $\delta\omega_t$ is larger than the frequency threshold value $\delta\omega_{TH}$ and a non-ignorable error occurs in the natural vibration frequency $\omega_t$, the process proceeds to step S309, and the dynamic characteristic setting unit 305 updates the natural vibration frequency $\omega_t$ of the coupling portion 101 to the new natural vibration frequency $\omega_t$ calculated by the feature amount calculation unit 304. On the other hand, in step S308, when it is determined that the frequency deviation $\delta\omega_t$ is equal to or less than the frequency threshold value $\delta\omega_{TH}$ and there is almost no error in the natural vibration frequency $\omega_t$, step S309 is skipped.

Similarly, in step S310, the dynamic characteristic setting unit 305 calculates the attenuation coefficient deviation $\delta\zeta_t$, which is a deviation between the current value of the attenuation coefficient $\zeta_t$ calculated by the feature amount calculation unit 304 and the previous value $\zeta_{tz}$ of the attenuation coefficient $\zeta_t$, and compares the attenuation coefficient deviation $\delta\zeta_t$ with the attenuation coefficient threshold value $\delta\zeta_{TH}$. When it is determined in step S310 that the attenuation coefficient deviation $\delta\zeta_t$ is larger than the attenuation coefficient threshold value $\delta\zeta_{TH}$ and a non-ignorable error occurs in the attenuation coefficient $\zeta_t$, the process proceeds to step S311, and the dynamic characteristic setting unit 305 updates the attenuation coefficient $\zeta_t$ of the coupling portion 101 to the new attenuation coefficient $\zeta_t$ calculated by the feature amount calculation unit 304. On the other hand, in step S310, when it is determined that the attenuation coefficient deviation $\delta\zeta t$ is equal to or less than the attenuation coefficient threshold value $\delta\zeta_{TH}$ and there is almost no error in the attenuation coefficient $\zeta_t$, step S311 is skipped. FIGS. 18(A)-18(H) are a time chart showing the longitudinal acceleration $A_{L1}$ and the like in a traveling scene in which the natural vibration frequency $\omega_t$ and the like are updated. FIG. 18(A), shows the first torque target value $T_{m1}{}^*$. FIG. 18(B), shows the second torque target value $T_{m2}{}^*$. FIG. 18(C), shows the drive shaft torque $T_d$. FIG. 18(D), shows the dynamic characteristic calculation flag FLG by a broken line, and shows the natural vibration frequency $\omega_t$ counted up by a solid line. FIG. 18(E), shows the motor rotation speed $\omega_m$. FIG. 18(F), shows the longitudinal acceleration $A_{L1}$ (actual response) of the electric vehicle 100 by a solid line, and shows the model response $A_{L1\text{-}ref}$ of the longitudinal acceleration $A_{L1}$ by a broken line. FIG. 18(G), for reference, shows the longitudinal acceleration $A_{L2}$ (actual response) of the coupled vehicle 102 by a solid line, and shows the model response $A_{L2\text{-}ref}$ of the longitudinal acceleration $A_{L2}$ by a broken line. FIG. 18(H) shows the difference $\Delta A_{L1}$ between the longitudinal acceleration $A_{L1}$ of the electric vehicle 100 and the model response $A_{L1\text{-}ref}$. Note that the horizontal axis of each graph in FIGS. 18(A)-18(H) represents time [s]. The time $t_1$ is a start time of an accelerator operation by the driver, and the time $t_2$ is the time after the predetermined period PP elapses from the time $t_1$.

As shown in FIG. 18(A), when the accelerator is operated at the time $t_1$, the first torque target value $T_{m1}{}^*$ is ramp input according to an operation amount. Accordingly, the dynamic characteristic calculation flag FLG is set to "1". As shown in FIGS. 18(B) and 18(C), the second torque target value $T_{m2}{}^*$ and the drive shaft torque $T_d$ increase in accordance with the first torque target value $T_{m1}{}^*$. Note that as shown in FIG. 18(E), after the time $t_1$, the motor rotation speed $\omega_m$ generally increases with the elapse of time.

As shown in FIG. 18(F), in the present embodiment, vibration occurs in the longitudinal acceleration $A_{L1}$ of the electric vehicle 100. As shown in FIG. 18(G), vibration also occurs in the longitudinal acceleration $A_{L2}$ of the coupled vehicle 102 corresponding to the vibration of the longitudinal acceleration $A_{L1}$. That is, the longitudinal vibration occurs in the electric vehicle 100 and the coupled vehicle 102. Then, as shown by the difference $\Delta A_{L1}$ in FIG. 18(H), the vibration of the longitudinal acceleration $A_{L1}$ has an amplitude which cannot be ignored with respect to the model response $A_{L1\text{-}ref}$, and therefore, as shown in FIG. 18(D), the dynamic characteristic calculation flag FLG is held at "1" from the time $t_1$ until the time $t_2$ after the predetermined period PP elapses. Therefore, the feature amount calculation unit 304 holds the time series data of the difference $\Delta A_{L1}$ in the predetermined period PP, and counts the peaks of the time series data of the difference $\Delta A_{L1}$ as shown in, for example, FIG. 18(D), thereby obtaining the natural vibration frequency $\omega_t$ of the longitudinal vibration. Similarly, the feature amount calculation unit 304 obtains the attenuation coefficient $\zeta_t$ of the longitudinal vibration based on a decrease in the amplitude of the difference $\Delta A_{L1}$. Here, it is assumed that the natural vibration frequency $\omega_t$ and the attenuation coefficient $\zeta_t$ used as the dynamic characteristics of the coupling portion 101 are updated to the natural vibration frequency $\omega_t$ and the attenuation coefficient $\zeta_t$ obtained by the feature amount calculation unit 304.

FIGS. 19(A)-19(H) are a time chart showing the longitudinal acceleration $A_{L1}$ and the like after updating the natural vibration frequency $\omega_t$ and the like. FIG. 19(A), shows the first torque target value $T_{m1}^*$. FIG. 19(B), shows the second torque target value $T_{m2}^*$. FIG. 19(C), shows the drive shaft torque $T_d$. FIG. 19(D), shows the dynamic characteristic calculation flag FLG by a broken line, and shows the natural vibration frequency $\omega_t$ counted up by a solid line. FIG. 19(E), shows the motor rotation speed $\omega_m$. FIG. 19(F), shows the longitudinal acceleration $A_{L1}$ (actual response) of the electric vehicle 100 by a solid line, and shows the model response $A_{L1\text{-}ref}$ of the longitudinal acceleration $A_{L1}$ by a broken line. FIG. 19(G), for reference, shows the longitudinal acceleration $A_{L2}$ (actual response) of the coupled vehicle 102 by a solid line, and shows the model response $A_{L2\text{-}ref}$ of the longitudinal acceleration $A_{L2}$ by a broken line. FIG. 19(H), shows the difference $\Delta A_{L1}$ between the longitudinal acceleration $A_{L1}$ of the electric vehicle 100 and the model response $A_{L1\text{-}ref}$. Note that the horizontal axis of each graph in FIGS. 19(A)-19(H) represents time [s]. The time $t_3$ is a start time of an accelerator operation by the driver, and the time $t_4$ is the time after the predetermined period PP elapses from the time $t_3$.

As shown in FIG. 19(A), when the accelerator is operated at the time $t_3$ after the natural vibration frequency $\omega_t$ and the like are updated, the first torque target value $T_{m1}^*$ is ramp input according to an operation amount. Accordingly, the dynamic characteristic calculation flag FLG is set to "1". As shown in FIGS. 19(B) and 19(C), the second torque target value $T_{m2}^*$ and the drive shaft torque $T_d$ increase in accordance with the first torque target value $T_{m1}^*$. Note that as shown in FIG. 19(E), after the time $t_3$, the motor rotation speed $\omega_m$ generally increases with the elapse of time. These behaviors are similar to those before the natural vibration frequency $\omega_t$ and the like are updated (FIGS. 18(A)-18(H)).

On the other hand, as shown in FIG. 19(F), since the natural vibration frequency $\omega_t$ and the like are updated, the vibration of the longitudinal acceleration $A_{L1}$ of the electric vehicle 100 is reduced. As shown in FIG. 19(G), the vibration of the longitudinal acceleration $A_{L2}$ of the coupled vehicle 102 is also reduced. Therefore, as shown in FIG. 19(H), the difference $\Delta A_L 1$ does not have a significant amplitude. Therefore, the dynamic characteristic calculation flag FLG is reset by the feature amount calculation unit 304, and is set to "0" at least from the time $t_3$ to the time $t_4$. Accordingly, the feature amount calculation unit 304 does not calculate a new natural vibration frequency $\omega_t$ and a new attenuation coefficient $\zeta_t$ based on the difference $\Delta A_L 1$, and the natural vibration frequency $\omega_t$ and the attenuation coefficient $\zeta_t$ used as the dynamic characteristics of the coupling portion 101 are held at the previous values $\omega_{tc}$ and $\zeta_{tc}$. As a result, the longitudinal vibration of the electric vehicle 100 and the coupled vehicle 102 is appropriately reduced even later.

As described above, in the electric vehicle 100 according to the third embodiment, the natural vibration frequency $\omega_t$ and the attenuation coefficient $\zeta_t$ which are dynamic characteristics of the coupling portion 101 are calculated based on the difference $\Delta A_{L1}$ between the longitudinal acceleration $A_{L1}$ which is an actual response and the model response $A_{L1\text{-}ref}$. Then, the first torque target value $T_{m1}^*$ is corrected based on the natural vibration frequency $\omega_t$ and the attenuation coefficient $\zeta_t$ calculated based on this difference $\Delta A_{L1}$. Accordingly, in the electric vehicle 100 according to the third embodiment, the longitudinal vibration of the electric vehicle 100 and the coupled vehicle 102 is appropriately reduced even when there is an error in the known values of the mechanical characteristics (the viscosity characteristic $C_F$, the elastic characteristic $K_F$, and the like) of the coupling portion 101 or there is a modeling error in the vehicle model.

Note that in the control according to the third embodiment, as in the first embodiment, the natural vibration frequency $\omega_t$ and the attenuation coefficient $\zeta_t$ are directly calculated, and the compensation for the longitudinal vibration unique to towing traveling and the compensation for the power transmission mechanism vibration are separately performed. However, the control according to the third embodiment can be performed in a configuration in which the compensation for the longitudinal vibration unique to towing traveling and the compensation for the power transmission mechanism vibration are substantially integrally performed, as in the second embodiment.

Figure 20:
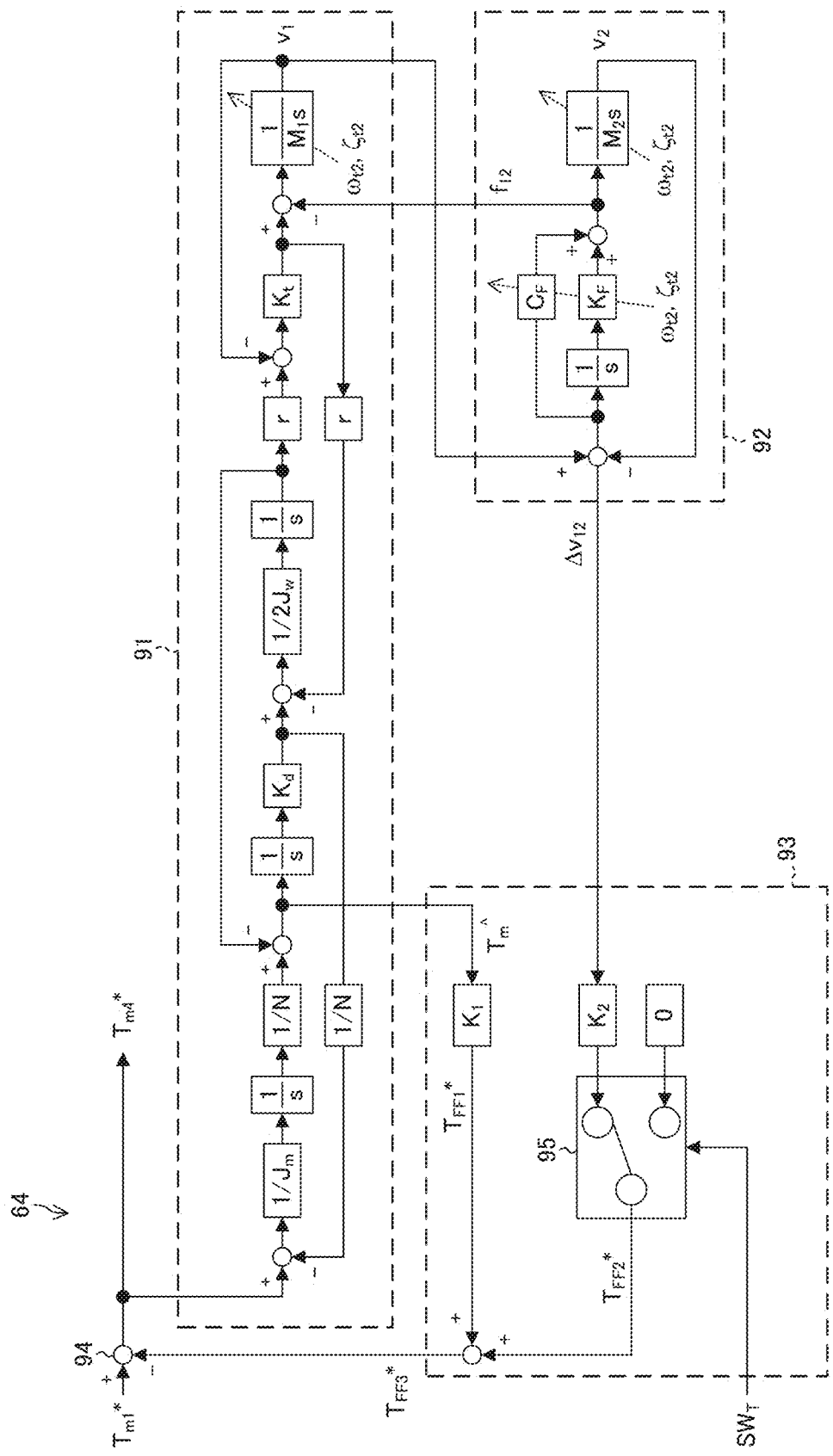
FIG. 20 is a block diagram showing a partial configuration of the vibration damping control unit in a case where compensation for longitudinal vibration unique to towing traveling and compensation for power transmission mechanism vibration are substantially integrally performed.

FIG. 20 is a block diagram showing a partial configuration of the vibration damping control unit 33 in a case where the compensation for the longitudinal vibration unique to towing traveling and the compensation for the power transmission mechanism vibration are substantially integrally performed. When the compensation for the longitudinal vibration unique to towing traveling and the compensation for the power transmission mechanism vibration are substantially integrally performed, as shown in FIG. 20, the feedforward compensation unit 64 of the vibration damping control unit 33 is configured to directly calculate the fourth torque target value $T_{m4}^*$ based on the first torque target value $T_{m1}^*$. Specifically, the feedforward compensation unit 64 includes the electric vehicle model 91, the coupled vehicle model 92, the compensation torque calculation unit 93, and the vibration damping correction processing unit 94. That is, the overall configuration is the same as that of the second embodiment.

When the control of the third embodiment is performed in the vibration damping control unit 33 (feedforward compensation unit 64) in this way, as shown in FIG. 20, the viscosity characteristic $C_F$ and the elastic characteristic $K_F$, the electric vehicle weight $M_1$, or the coupled vehicle weight $M_2$ are variable according to the natural vibration frequency $\omega_t$ and the attenuation coefficient $\zeta_t$ set by the dynamic characteristic setting unit 305. That is, the dynamic characteristic setting unit 305 is configured to correct the viscosity characteristic $C_F$ and the elastic characteristic $K_F$ included in the coupled vehicle model 92, the electric vehicle weight $M_1$ included in the electric vehicle model 91, and the coupled vehicle weight $M_2$ included in the coupled vehicle model 92, according to the set natural vibration frequency $\omega_t$ and the set attenuation coefficient $\zeta_t$. The dynamic characteristic setting unit 305 can inversely calculate the viscosity characteristic $C_F$ and the elastic characteristic $K_F$ corresponding to the natural vibration frequency $\omega_t$ and the attenuation coefficient $\zeta_t$ to be set, the electric vehicle weight $M_1$, or the coupled vehicle weight $M_2$ in accordance with the equations of motion or the vehicle model described above.

For example, when the natural vibration frequency $\omega_t$ is updated, the dynamic characteristic setting unit 305 calculates the elastic characteristic $K_F$ (hereinafter, referred to as a corrected elastic characteristic $K_F'$ (not shown)) according to the natural vibration frequency $\omega_t$ to be set. Then, the dynamic characteristic setting unit 305 updates the elastic characteristic $K_F$ of the coupled vehicle model 92 to this corrected elastic characteristic $K_F'$. Accordingly, similarly to the control of the third embodiment, the longitudinal vibration of the electric vehicle 100 and the coupled vehicle 102 is appropriately reduced even when there is an error in the known values of the mechanical characteristics (the viscosity characteristic $C_F$, the elastic characteristic $K_F$, and the like) of the coupling portion 101 or there is a modeling error in the vehicle model.

For example, when the attenuation coefficient $\zeta_t$ is updated, the dynamic characteristic setting unit 305 calculates the viscosity characteristic $C_F$ (hereinafter, referred to as a corrected viscosity characteristic $C_F'$ (not shown)) corresponding to the attenuation coefficient $\zeta_t$ to be set. Then, the dynamic characteristic setting unit 305 updates the viscosity characteristic $C_F$ of the coupled vehicle model 92 to the corrected viscosity characteristic $C_F'$. Accordingly, similarly to the control of the third embodiment, the longitudinal vibration of the electric vehicle 100 and the coupled vehicle 102 is appropriately reduced even when there is an error in the known values of the mechanical characteristics (the viscosity characteristic $C_F$, the elastic characteristic $K_F$, and the like) of the coupling portion 101 or there is a modeling error in the vehicle model.

Since the natural vibration frequency $\omega_t$ is a parameter directly related to the elastic characteristic $K_F$, as described above, when updating the natural vibration frequency $\omega_t$, it is particularly preferable that the dynamic characteristic setting unit 305 updates the elastic characteristic $K_F$ to the corrected elastic characteristic $K_F'$. Since the attenuation coefficient $\zeta_t$ is a parameter directly related to the viscosity characteristic $C_F$, it is particularly preferable that the dynamic characteristic setting unit 305 updates the viscosity characteristic $C_F$ to the corrected viscosity characteristic $C_F'$ when update the attenuation coefficient $\zeta_t$ as described above. However, the relative vehicle speed $\Delta v_{12}$ reflecting the natural vibration frequency $\omega_t$ and the attenuation coefficient $\zeta_t$ to be set may be obtained in the vibration damping control unit 33 that substantially integrally performs the compensation for the longitudinal vibration unique to towing traveling and the compensation for the power transmission mechanism vibration. Therefore, instead of directly updating the elastic characteristic $K_F$ and the viscosity characteristic $C_F$, other parameters may be updated according to the natural vibration frequency $\omega_t$ and the attenuation coefficient $\zeta_t$ to be set. For example, the dynamic characteristic setting unit 305 can calculate the electric vehicle weight $M_1$ (hereinafter, referred to as a corrected electric vehicle weight $M_1'$ (not shown)) corresponding to the natural vibration frequency $\omega_t$ or the attenuation coefficient $\zeta_t$ to be set, and update the electric vehicle weight $M_1$ included in the electric vehicle model 91 to the corrected electric vehicle weight $M_1'$. Similarly, the dynamic characteristic setting unit 305 can calculate the coupled vehicle weight $M_2$ (hereinafter, referred to as a corrected coupled vehicle weight $M_2'$ (not shown)) corresponding to the natural vibration frequency $\omega_t$ or the attenuation coefficient $\zeta_t$ to be set, and update the coupled vehicle weight $M_2$ included in the coupled vehicle model 92 to the corrected coupled vehicle weight $M_2'$. In these cases, similarly to the control of the third embodiment, the longitudinal vibration of the electric vehicle 100 and the coupled vehicle 102 is appropriately reduced even when there is an error in the known values of the mechanical characteristics (the viscosity characteristic $C_F$, the elastic characteristic $K_F$, and the like) of the coupling portion 101 or there is a modeling error in the vehicle model.

Note that the dynamic characteristic setting unit 305 can calculate two or more parameters among the corrected elastic characteristic $K_F'$, the corrected viscosity characteristic $C_F'$, the corrected electric vehicle weight $M_1'$, and the corrected coupled vehicle weight $M_2'$ according to the natural vibration frequency $\omega_t$ or the attenuation coefficient $\zeta_t$ to be set, and update the corresponding plurality of parameters. However, the dynamic characteristic setting unit 305 preferably corrects the elastic characteristic $K_F$ based on at least the natural vibration frequency $\omega_t$ to be set. The dynamic characteristic setting unit 305 preferably corrects the elastic characteristic $K_F$ and the viscosity characteristic $C_F$ based on the natural vibration frequency $\omega_t$ and the attenuation coefficient $\zeta_t$ to be set.

As described above, the third embodiment can be implemented independently instead of the first embodiment or the second embodiment. However, the third embodiment can be implemented together with the first embodiment or the second embodiment. When the control according to the third embodiment is performed together with the control according to the first embodiment, for example, the initial values $\omega_{t0}$ and $\zeta_{t0}$ of the natural vibration frequency $\omega_t$ and the attenuation coefficient $\zeta_t$ according to the third embodiment may be changed to the natural vibration frequency $\omega_t$ and the attenuation coefficient t calculated by the feature amount calculation unit 62 according to the first embodiment. When the control according to the third embodiment is performed together with the control according to the second embodiment, for example, as in the second embodiment, the electric vehicle weight $M_1$ and the coupled vehicle weight $M_2$ may be set according to respective estimation results thereof, and the elastic characteristic $K_F$, the viscosity characteristic $C_F$, the electric vehicle weight $M_1$, and the coupled vehicle weight $M_2$ may be updated according to the natural vibration frequency $\omega_t$ and the attenuation coefficient $\zeta_t$ to be set.

As described above, when the control for the electric vehicle 100 according to the third embodiment is performed together with the first embodiment or the second embodiment, the state in which the longitudinal vibration is reduced by the control of the first embodiment or the second embodiment is a standard state. The control according to the third embodiment is configured to particularly accurately reduce (compensate for) the errors included in the known values of the elastic characteristic $K_F$ and the viscosity characteristic $C_F$, or the longitudinal vibration still remaining due to the modeling error of the electric vehicle 100 or the like. Accordingly, when the control for the electric vehicle 100 according to the third embodiment is performed together with the control according to the first embodiment or the second embodiment, the longitudinal vibration of the electric vehicle 100 and the coupled vehicle 102 can be particularly suitably reduced.

Modifications

Note that in each of the above embodiments, the electric vehicle 100 includes the towing traveling switch 28 as described above, and it is determined whether the coupled vehicle 102 is coupled to the coupling portion 101 based on the towing traveling signal $SW_T$ output from the towing traveling switch 28, but the present invention is not limited thereto. For example, the towing traveling switch 28 may be provided in the coupling portion 101. In this case, when the coupled vehicle 102 is coupled to the coupling portion 101, the towing traveling signal $SW_T$ automatically becomes ON without any operation by the driver or the like. When the electric vehicle 100 is equipped with a rear camera that captures an image of a rear side of the vehicle, the coupled vehicle 102 may be recognized using the image captured by the rear camera, and the motor controller 13 may determine whether the coupled vehicle 102 is coupled to the coupling portion 101 based on the recognition result. When the coupled vehicle weight $M_2$ becomes a significant value, specifically, for example, when the estimated weight $M_2$ becomes a predetermined threshold value or more, the motor controller 13 may determine that the coupled vehicle 102 is coupled to the coupling portion 101. In this case, whether the coupled vehicle 102 is coupled to the coupling portion 101 is simply and directly determined based on whether the coupled vehicle weight $M_2$ is detected, regardless of the operation of the towing traveling switch 28 by the driver or the like, the recognition processing of the coupled vehicle 102 by the rear camera, or the like.

In each of the above embodiments, the weights $M_1$ and $M_2$ of the electric vehicle 100 and the coupled vehicle 102 are estimated, but these values can also be set as default values. For example, when a change in the weight $M_1$ of the electric vehicle 100 is considered to be ignorable, the design weight $M_{ini}$ of the electric vehicle 100 can be used. The weight $M_2$ of the coupled vehicle 102 can be a selectable manual input or the like according to the vehicle type or the like. As described above, even in the case where the weights $M_1$ and $M_2$ of the electric vehicle 100 and the coupled vehicle 102 are not sequentially estimated and are set to default values, the vibration damping effect against the longitudinal vibration unique to the towing traveling can be obtained as in the above embodiments. However, as in each of the above embodiments, by sequentially estimating the weights $M_1$ and $M_2$ of the electric vehicle 100 and the coupled vehicle 102, the longitudinal vibration unique to the towing traveling is particularly accurately reduced.

In each of the above embodiments, the power transmission mechanism vibration is reduced, but when the electric vehicle 100 does not include the drive shaft 22, the damping control of the power transmission mechanism vibration can be omitted. That is, the power transmission mechanism vibration damping unit 37 may be omitted.

In addition, in each of the above embodiments, in order to identify the dynamic characteristics of the coupling portion 101 to which the coupled vehicle 102 is coupled, the viscosity characteristics $C_F$ and the elastic characteristics $K_F$ are considered as the mechanical characteristics of the coupling portion 101, but the present invention is not limited thereto. When the coupling portion 101 includes a gear, backlash of the gear can be considered. Accordingly, the dynamic characteristics of the coupling portion 101 to which the coupled vehicle 102 is coupled are particularly accurately specified. However, by considering at least the viscosity characteristic $C_F$ and the elastic characteristic $K_F$ as the mechanical characteristics of the coupling portion 101, the dynamic characteristics of the coupling portion 101 to which the coupled vehicle 102 is coupled are identified to such an extent that the longitudinal vibration unique to towing traveling can be easily and sufficiently reduced.

In each of the above embodiments, the dynamic characteristics of the coupling portion 101 are identified by the viscosity characteristic $C_F$ and the elastic characteristic $K_F$, but the dynamic characteristic of the coupling portion 101 may be identified by either the elastic characteristic $K_F$ or the viscosity characteristic $C_F$. However, in order to particularly accurately reduce the longitudinal vibration, it is preferable that the dynamic characteristic of the coupling portion 101 is identified by at least the elastic characteristic $K_F$. That is, in the first vibration damping correction processing, the component of the natural vibration frequency $\omega_t$ included in the first torque target value $T_{m1}^*$ may be reduced based on at least the natural vibration frequency $\omega_t$. In the first vibration damping correction processing, the component of the natural vibration frequency $\omega_t$ included in the first torque target value $T_{m1}^*$ may also be reduced according to the attenuation coefficient $\zeta_t$ based on the natural vibration frequency $\omega_t$ and the attenuation coefficient $\zeta_t$.

In each of the above embodiments, the electric vehicle 100 calculates the first torque target value $T_{m1}^*$ based on the vehicle operation (accelerator operation or the like) by the driver, but the present invention is not limited thereto. The electric vehicle 100 may perform a vehicle operation. For example, in a case where the electric vehicle 100 is an autonomous driving vehicle or in a case where the electric vehicle 100 assists the vehicle operation by the driver as necessary, the electric vehicle 100 can calculate (determine) the first torque target value $T_{m1}^*$ according to the determination of the electric vehicle 100 itself without depending on the vehicle operation by the driver. That is, the "vehicle operation" includes, in addition to the accelerator operation or the like by the driver, an operation of setting or changing a vehicle variable or the like that can be set or changed by an operation by the driver according to the determination of the electric vehicle 100 itself.

In each of the above embodiments, since the longitudinal vibration of the electric vehicle 100 and the longitudinal vibration of the coupled vehicle 102 are relative to each other and are related to each other, calculation using the longitudinal acceleration $A_{L1}$ of the electric vehicle 100 or the like can be replaced with calculation using the longitudinal acceleration $A_{L2}$ of the coupled vehicle 102 or the like. In each of the above embodiments, calculation using the longitudinal acceleration $A_{L1}$ of the electric vehicle 100 or the like can be replaced with calculation using the longitudinal acceleration $A_{L1}$ of the electric vehicle 100 and the longitudinal acceleration $A_{L2}$ of the coupled vehicle 102 or the like. However, depending on the specific coupled vehicle 102, the longitudinal acceleration $A_{L2}$ may not necessarily be acquired, and it is preferable that the longitudinal acceleration $A_{L1}$ of the electric vehicle 100 is acquired and used as in the above embodiments.

As described above, the control method for an electric vehicle according to each of the above embodiments and modification is a control method for the electric vehicle 100 that includes the motor 10 as a drive source and the coupling portion 101 coupled to the other vehicle, and travels while towing a coupled vehicle 102, which is the other vehicle coupled to the coupling portion 101. In this control method, the basic torque target value (first torque target value $T_{m1}^*$) representing the torque (motor torque $T_m$) to be output by the motor 10 is calculated based on the vehicle operation (accelerator opening $A_{po}$ or the like). The final torque command value (sixth torque target value $T_{m6}^*$), which is a final command value for the motor torque $T_m$, is calculated by performing correction processing (first vibration damping correction processing) for reducing the longitudinal vibration component generated in the electric vehicle 100 due to the coupled vehicle 102 being coupled to the coupling portion 101 on the basic torque target value, based on a dynamic characteristic of the coupling portion 101 to which the coupled vehicle 102 is coupled. Then, the motor 10 is controlled based on this final torque command value.

In this way, by performing the correction processing for reducing the longitudinal vibration unique to the towing traveling, the rise of the torque required by the vehicle operation and the smooth acceleration are achieved. Especially, although it is difficult to achieve both the rise of the torque as required and the smooth acceleration when the longitudinal vibration is generated during towing traveling, the rise of the torque as required and the smooth acceleration can be achieved when the longitudinal vibration is reduced by the first vibration damping correction processing.

In the control method for an electric vehicle according to each of the above embodiments and modification, in the correction processing (first vibration damping correction processing) for reducing the longitudinal vibration component, the dynamic characteristics of the coupling portion 101 to which the coupled vehicle 102 is coupled are identified based on the weight of the electric vehicle 100 (electric vehicle weight $M_1$), the weight of the coupled vehicle 102 (coupled vehicle weight $M_2$), and the mechanical characteristics of the coupling portion 101 (viscosity characteristic $C_F$ and elastic characteristic $K_F$). In this way, the longitudinal vibration unique to the towing traveling is particularly accurately reduced by identifying the dynamic characteristics of the coupling portion 101 to which the coupled vehicle 102 is coupled based on the electric vehicle weight $M_1$, the coupled vehicle weight $M_2$, and the mechanical characteristics of the coupling portion 101.

In the control method for an electric vehicle according to each of the above embodiments and modification, the mechanical characteristics of the coupling portion 101 include at least the viscosity characteristic $C_F$ and the elastic characteristic $K_F$ of the coupling portion 101. That is, in order to identify the dynamic characteristics of the coupling portion 101 to which the coupled vehicle 102 is coupled, at least the viscosity characteristic $C_F$ and the elastic characteristic $K_F$ of the coupling portion 101 are considered. Therefore, by using at least the viscosity characteristic $C_F$ and the elastic characteristic $K_F$ of the coupling portion 101, the dynamic characteristics of the coupling portion 101 to which the coupled vehicle 102 is coupled are identified easily and accurately.

In the control method for an electric vehicle according to each of the above embodiments and modification, specifically, the total weight $M\hat{\,}$ of the electric vehicle 100 and the coupled vehicle 102 is estimated based on the longitudinal acceleration (longitudinal acceleration $A_{L1}$) of the electric vehicle 100. The weight of the electric vehicle 100 (electric vehicle weight $M_1$) is estimated based on the stroke amounts $ST_{FL}$, $ST_{FR}$, $ST_{RL}$, and $ST_{RR}$ of the suspensions included in the electric vehicle 100. Then, the weight of the coupled vehicle 102 (coupled vehicle weight $M_2$) is estimated by subtracting the weight of the electric vehicle 100 (electric vehicle weight $M_1$) from the total weight $M\hat{\,}$.

The coupled vehicle weight $M_2$ varies depending on the specific coupled vehicle 102. Accordingly, as described above, by sequentially estimating the electric vehicle weight $M_1$ and the coupled vehicle weight $M_2$ during towing traveling, the longitudinal vibration unique to the towing traveling is accurately reduced regardless of the specific coupled vehicle 102.

In the control method for an electric vehicle according to each of the above embodiments and modification, it is determined whether the coupled vehicle 102 is coupled to the coupling portion 101. When it is determined that the coupled vehicle 102 is not coupled to the coupling portion 101, the correction processing for reducing the longitudinal vibration unique to the towing traveling is not executed. On the other hand, when it is determined that the coupled vehicle 102 is coupled to the coupling portion 101, the correction processing for reducing the longitudinal vibration unique to the towing traveling is executed. In this way, the control stability is improved by determining whether the vehicle is in the towing traveling scene and performing the correction processing for reducing the longitudinal vibration unique thereto as necessary. The load of calculation and the like is reduced.

In the control method for an electric vehicle according to the first embodiment and the modification, in the correction processing (first vibration damping correction processing) for reducing the longitudinal vibration unique to the towing traveling, the natural vibration frequency $\omega_t$ of the longitudinal vibration component is calculated based on the weight of the electric vehicle 100 (electric vehicle weight $M_1$), the weight of the coupled vehicle 102 (coupled vehicle weight $M_2$), and the mechanical characteristics of the coupling portion 101 (viscosity characteristic $C_F$ and elastic characteristic $K_F$). Then, the component of the natural vibration frequency $\omega_t$ included in the basic torque target value (first torque target value $T_{m1}^*$) is reduced. As described above, by identifying the natural vibration frequency $\omega_t$, the longitudinal vibration unique to towing traveling is particularly accurately reduced.

In the control method for an electric vehicle according to the first embodiment and the modification, in the correction processing (first vibration damping correction processing) for reducing the longitudinal vibration unique to the towing traveling, the attenuation coefficient $\zeta_t$ of the longitudinal vibration component is further calculated based on the weight of the electric vehicle 100 (electric vehicle weight $M_1$), the weight of the coupled vehicle 102 (coupled vehicle weight $M_2$), and the mechanical characteristics of the coupling portion 101 (viscosity characteristic $C_F$ and elastic characteristic $K_F$). Then, the component of the natural vibration frequency $\omega_t$ included in the basic torque target value (first torque target value $T_{m1}^*$) is reduced according to the attenuation coefficient $\zeta_t$. In this way, by reducing the component of the natural vibration frequency $\omega_t$ according to the attenuation coefficient $\zeta_t$, the longitudinal vibration unique to the towing traveling is particularly efficiently reduced.

In the control method for an electric vehicle according to the first embodiment and the modification, the correction processing (first vibration damping correction processing) for reducing the longitudinal vibration unique to the towing traveling is particularly configured so that the dynamic characteristics of the coupling portion 101 are identified and the component of the natural vibration frequency $\omega_t$ included in the basic torque target value (first torque target value $T_{m1}^*$) is reduced according to the attenuation coefficient $\zeta_t$, by calculating the natural vibration frequency $\omega_t$ and the attenuation coefficient $\zeta_t$ of the longitudinal vibration component based on the weight of the electric vehicle 100 (electric vehicle weight $M_1$), the weight of the coupled vehicle 102 (coupled vehicle weight $M_2$), and the mechanical characteristics of the coupling portion 101 (viscosity characteristic $C_F$ and elastic characteristic $K_F$). In this way, the dynamic characteristics of the coupling portion 101 are identified by the natural vibration frequency $\omega_t$ and the attenuation coefficient $\zeta_t$, and the component of the natural vibration frequency or is reduced according to the attenuation coefficient $\zeta_t$, and thus the longitudinal vibration unique to the towing traveling is particularly suitably reduced.

In the control method for an electric vehicle according to the first embodiment and the modification, the correction processing (first vibration damping correction processing) for reducing the longitudinal vibration unique to towing traveling is performed by processing the basic torque target value (first torque target value $T_{m1}^*$) using a band-stop filter in which the natural vibration frequency or is set as a center frequency for reduction and the attenuation coefficient ($\zeta$ in the equation (20)) is set to 1 or more. In this way, by performing the correction processing for reducing the longitudinal vibration unique to the towing traveling by the band-stop filter, the longitudinal vibration unique to the towing traveling is reduced, and a high-speed response is achieved.

In the control method for an electric vehicle according to the second embodiment and the modification, in the correction processing (vibration damping correction processing including the first vibration damping correction processing) for reducing the longitudinal vibration unique to the towing traveling, the relative vehicle speed $\Delta v_{12}$ between the electric vehicle 100 and the coupled vehicle 102 is calculated based on the dynamic characteristics of the coupling portion 101 to which the coupled vehicle 102 is coupled. Based on the relative vehicle speed $\Delta v_{12}$, a correction torque (second compensation torque $T_{FF2}^*$) corresponding to the longitudinal vibration component is calculated. Then, the basic torque target value (first torque target value $T_{m1}^*$) is corrected using the correction torque (second compensation torque $T_{FF2}^*$). In this way, when the basic torque target value (first torque target value $T_{m1}^*$) is corrected using the correction torque (second compensation torque $T_{FF2}^*$) based on the relative vehicle speed $\Delta v_{12}$, the longitudinal vibration unique to the towing traveling is reduced, and particularly, a high-speed response is achieved.

In the control method for an electric vehicle according to the third embodiment and the modification, the correction processing (first vibration damping correction processing, or vibration damping correction processing including the first vibration damping correction processing) for reducing the longitudinal vibration unique to the towing traveling is configured to identify the dynamic characteristics of the coupling portion 101 by calculating the natural vibration frequency $\omega_t$ of the longitudinal vibration component, or the attenuation coefficient $\zeta_t$, or both the natural vibration frequency $\omega_t$ and the attenuation coefficient $\zeta_t$ based on the longitudinal acceleration ($A_{L1}$) of the electric vehicle 100. Further, the correction processing (first vibration damping correction processing, or vibration damping correction processing including the first vibration damping correction processing) is configured to reduce the component of the natural vibration frequency $\omega_t$ included in the basic torque target value (the first torque target value $T_{m1}^*$). In this way, in a case where the natural vibration frequency $\omega_t$ and/or the attenuation coefficient $\zeta_t$ is identified based on the longitudinal acceleration $A_{L1}$ of the electric vehicle 100 and the component of the natural vibration frequency $\omega_t$ is reduced, the longitudinal vibration unique to the towing traveling is accurately reduced even when an error is included in the mechanical characteristics (the viscosity characteristic $C_F$ and the elastic characteristic $K_F$) of the coupling portion 101 or the vehicle model of the electric vehicle 100. Since the electric vehicle 100 normally includes a sensor that detects the longitudinal acceleration $A_{L1}$, according to the control method for an electric vehicle according to the third embodiment and the modification, it is not necessary to additionally provide a new sensor or the like in order to reduce the longitudinal vibration unique to towing traveling, and the longitudinal vibration is accurately reduced without increasing a cost.

In the control method for an electric vehicle according to the third embodiment and the modification, the correction processing (first vibration damping correction processing, or vibration damping correction processing including the first vibration damping correction processing) for reducing the longitudinal vibration unique to the towing traveling is particularly configured to identify the dynamic characteristics of the coupling portion 101 and reduce the component of the natural vibration frequency $\omega_t$ included in the basic torque target value (first torque target value $T_{m1}^*$) according to the attenuation coefficient $\zeta_t$ by calculating the natural vibration frequency $\omega_t$ of the longitudinal vibration component and the attenuation coefficient $\zeta_t$ based on the longitudinal acceleration (longitudinal acceleration $A_{L1}$) of the electric vehicle 100. In this way, in a case where the natural vibration frequency $\omega_t$ and the attenuation coefficient $\zeta_t$ are identified based on the longitudinal acceleration ($A_{L1}$) of the electric vehicle 100 and the component of the natural vibration frequency $\omega_t$ is reduced according to the attenuation coefficient $\zeta_t$, the longitudinal vibration unique to the towing traveling is particularly accurately reduced even when an error is included in the mechanical characteristics ($C_F$ and $K_F$) of the coupling portion 101 or the vehicle model of the electric vehicle 100.

In the control method for an electric vehicle according to the third embodiment and the modification, the correction processing (first vibration damping correction processing, or vibration damping correction processing including the first vibration damping correction processing) for reducing the longitudinal vibration unique to the towing traveling is configured to be executed when the change rate ($\delta T_{m1}^*$) of the basic torque target value (the first torque target value $T_{m1}^*$) is greater than the predetermined threshold value ($\delta T_{TH}$). In this way, the traveling scene in which the longitudinal vibration is likely to occur is determined based on the change rate $\delta T_{m1}^*$ of the first torque target value $T_{m1}^*$, and at least the first vibration damping correction processing is executed in such a traveling scene, and therefore the longitudinal vibration of the electric vehicle 100 and the coupled vehicle 102 is particularly accurately reduced.

In the control method for an electric vehicle according to the third embodiment and the modification, the correction processing (first vibration damping correction processing, or vibration damping correction processing including the first vibration damping correction processing) for reducing the longitudinal vibration unique to the towing traveling is configured to calculate the model response $A_{L1\text{-}ref}$ of the longitudinal acceleration ($A_{L1}$), and to calculate the natural vibration frequency $\omega_t$ and the attenuation coefficient $\zeta_t$ based on the difference $\Delta A_{L11}$ between the acquired longitudinal acceleration ($A_{L1}$) and the model response $A_{L1\text{-}ref}$ of the longitudinal acceleration ($A_{L1}$). In this way, by calculating the natural vibration frequency $\omega_t$ and the attenuation coefficient $\zeta_t$ based on the difference $\Delta A_{L1}$, the natural vibration frequency $\omega_t$ and the attenuation coefficient $\zeta_t$ are estimated accurately in accordance with the actual condition regardless of known values of the elastic characteristic $K_F$ and the viscosity characteristic $C_F$, a modeling error, or the like. As a result, the longitudinal vibration of the electric vehicle 100 and the coupled vehicle 102 is particularly appropriately reduced. Note that when the control for an electric vehicle according to the third embodiment and the modification are performed together with the control of the first embodiment or the second embodiment, the remaining longitudinal vibration can be accurately reduced even when the control of the first embodiment or the second embodiment are performed.

In the control method for an electric vehicle according to the third embodiment and the modification, the model response $A_{L1-ref}$ of the longitudinal acceleration ($A_{L1}$) is calculated based on the basic torque target value (first torque target value $T_{m1}^*$), the weight of the electric vehicle 100 ($M_1$), and the weight of the coupled vehicle 102 ($M_2$). In this way, the model response $A_{L1-ref}$ of the longitudinal acceleration $A_{L1}$ is calculated based on the first torque target value $T_{m1}^*$ and the estimation values of the electric vehicle weight $M_1$ and the coupled vehicle weight $M_2$, so that the model response $A_{L1-ref}$ of the longitudinal acceleration $A_{L1}$ in accordance with the actual condition can be acquired. Therefore, the longitudinal vibration of the electric vehicle 100 and the coupled vehicle 102 is particularly appropriately reduced.

In the control method for an electric vehicle according to the third embodiment and the modification, the correction processing (first vibration damping correction processing, or vibration damping correction processing including the first vibration damping correction processing) for reducing the longitudinal vibration unique to the towing traveling is configured to calculate the natural vibration frequency $\omega_t$ and the attenuation coefficient $\zeta_t$ by performing the frequency analysis processing on the difference $\Delta A_{L1}$ between the acquired longitudinal acceleration ($A_{L1}$) and the model response $A_{L1-ref}$ of the longitudinal acceleration ($A_{L1}$). In this way, the natural vibration frequency $\omega_t$ and the attenuation coefficient $\zeta_t$ are calculated by performing the frequency analysis processing on the difference $\Delta A_{L1}$ between the longitudinal acceleration $A_{L1}$, which is an actual response, and the model response $A_{L1-ref}$ of the longitudinal acceleration $A_{L1}$, so that particularly accurate natural vibration frequency $\omega_t$ and attenuation coefficient $\zeta_t$ corresponding to actually occurring longitudinal vibration can be obtained. Therefore, the longitudinal vibration of the electric vehicle 100 and the coupled vehicle 102 is particularly appropriately reduced.

In the control method for an electric vehicle according to the third embodiment and the modification, the correction processing (first vibration damping correction processing, or vibration damping correction processing including the first vibration damping correction processing) for reducing the longitudinal vibration unique to the towing traveling is configured to update the dynamic characteristics of the coupling portion 101 ($\omega_t$, $\zeta_t$) when the dynamic characteristics change more than the predetermined threshold values ($\delta\omega_{TH}$, $\delta\zeta_{TH}$) with respect to the previous value ($\omega_{tz}$, $\zeta_{tz}$). In this way, by updating the natural vibration frequency $\omega_t$ and the attenuation coefficient $\zeta_t$ when the natural vibration frequency $\omega_t$ and the attenuation coefficient $\zeta_t$ deviate from the existing constants to predetermined degrees or more, a severe change in the natural vibration frequency $\omega_t$ and the attenuation coefficient $\zeta_t$ is prevented, and the natural vibration frequency $\omega_t$ and the attenuation coefficient $\zeta_t$ are appropriately updated when necessary. Therefore, the longitudinal vibration of the electric vehicle 100 and the coupled vehicle 102 is particularly appropriately reduced.

In the control method for an electric vehicle according to the third embodiment and the modification, the correction processing (first vibration damping correction processing, or vibration damping correction processing including the first vibration damping correction processing) for reducing the longitudinal vibration unique to the towing traveling is configured to limit the ranges of the natural vibration frequency $\omega_t$ and the attenuation coefficient $\zeta_t$ that can be set to predetermined ranges (ranges of values that can be actually taken during the towing traveling). In this way, by limiting the ranges of the natural vibration frequency $\omega_t$ and the attenuation coefficient $\zeta_t$ to realistic ranges, even when an estimation error is included in the natural vibration frequency $\omega_t$ or the attenuation coefficient $\zeta_t$, the behavior of the electric vehicle 100 is prevented from being unstable due to the estimation error.

In the control method for an electric vehicle according to the third embodiment and the modification, the correction processing (first vibration damping correction processing, or vibration damping correction processing including the first vibration damping correction processing) for reducing the longitudinal vibration unique to the towing traveling is configured to calculate the natural vibration frequency $\omega_t$ and attenuation coefficient $\zeta_t$ of the longitudinal vibration component based on the longitudinal acceleration ($A_{L1}$) of the electric vehicle 100, correct the mechanical characteristics ($K_F$, $C_F$) of the coupling portion 101 or the weight ($M_1$, $M_2$) of the electric vehicle 100 or the coupled vehicle 102 based on the natural vibration frequency $\omega_t$ and attenuation coefficient $\zeta_t$, calculate the relative vehicle speed $\Delta v_{12}$ between the electric vehicle 100 and the coupled vehicle 102 based on the corrected mechanical characteristics ($K_F'$, $C_F'$) of the coupling portion 101 or the corrected weight ($M_1'$, $M_2'$) of the electric vehicle 100 or the coupled vehicle 102, calculate the correction torque ($T_{FF2}^*$) for the longitudinal vibration component based on the relative vehicle speed $\Delta v_{12}$, and correct the basic torque target value (first torque target value $T_{m1}^*$) using the correction torque ($T_{FF2}^*$). In this way, in a case where the natural vibration frequency $\omega_t$ and/or the attenuation coefficient t is identified based on the longitudinal acceleration ($A_{L1}$) of the electric vehicle 100 and the component of the natural vibration frequency $\omega_t$ is reduced, the longitudinal vibration unique to the towing traveling is accurately reduced even when an error is included in the mechanical characteristics (the viscosity characteristic $C_F$ and the elastic characteristic $K_F$) of the coupling portion 101 or the vehicle model of the electric vehicle 100. Since the electric vehicle 100 normally includes a sensor that detects the longitudinal acceleration $A_{L1}$, according to the control method for an electric vehicle according to the third embodiment and the modification, it is not necessary to additionally provide a new sensor or the like in order to reduce the longitudinal vibration unique to towing traveling, and the longitudinal vibration is accurately reduced without increasing a cost.

Although the embodiments and modification of the present invention have been described above, configurations described in the above embodiments and the modification are merely a part of application examples of the present invention, and are not intended to limit the technical scope of the present invention.

The invention claimed is:

1. A control method for an electric vehicle that includes a motor as a drive source and a coupling portion coupled to another vehicle, and travels while towing a coupled vehicle, which is the other vehicle coupled to the coupling portion, the control method comprising:
    calculating a basic torque target value representing a torque to be output by the motor based on a vehicle operation;
    calculating a final torque command value, which is a final command value for the torque, by performing correction processing for reducing a longitudinal vibration component generated in the electric vehicle due to the coupled vehicle being coupled to the coupling portion on the basic torque target value, based on a dynamic characteristic of the coupling portion to which the coupled vehicle is coupled; and
    controlling the motor based on the final torque command value.

2. The control method for an electric vehicle according to claim 1, wherein the correction processing includes identifying the dynamic characteristic based on a weight of the electric vehicle, a weight of the coupled vehicle, and mechanical characteristics of the coupling portion.

3. The control method for an electric vehicle according to claim 2, wherein the mechanical characteristics of the coupling portion include at least a viscosity characteristic and an elastic characteristic of the coupling portion.

4. The control method for an electric vehicle according to claim 2, further comprising:
    estimating a total weight of the electric vehicle and the coupled vehicle based on a longitudinal acceleration of the electric vehicle;
    estimating the weight of the electric vehicle based on a stroke amount of a suspension included in the electric vehicle; and
    estimating the weight of the coupled vehicle by subtracting the weight of the electric vehicle from the total weight.

5. The control method for an electric vehicle according to claim 1, wherein the correction processing includes:
    identifying the dynamic characteristic by calculating a natural vibration frequency and an attenuation coefficient of the longitudinal vibration component based on a weight of the electric vehicle, a weight of the coupled vehicle, and mechanical characteristics of the coupling portion; and
    reducing a component of the natural vibration frequency included in the basic torque target value according to the attenuation coefficient.

6. The control method for an electric vehicle according to claim 5, wherein the correction processing is performed by processing the basic torque target value using a band-stop filter in which the natural vibration frequency is set as a center frequency for reduction and the attenuation coefficient is set to 1 or more.

7. The control method for an electric vehicle according to claim 1, wherein the correction processing includes:
    calculating a relative vehicle speed between the electric vehicle and the coupled vehicle based on the dynamic characteristic;
    calculating a correction torque for the longitudinal vibration component based on the relative vehicle speed; and
    correcting the basic torque target value using the correction torque.

8. The control method for an electric vehicle according to claim 1, wherein the correction processing includes:
    identifying the dynamic characteristic by calculating a natural vibration frequency and an attenuation coefficient of the longitudinal vibration component based on a longitudinal acceleration of the electric vehicle; and
    reducing a component of the natural vibration frequency included in the basic torque target value according to the attenuation coefficient.

9. The control method for an electric vehicle according to claim 8, wherein the correction processing is executed at least when a change rate of the basic torque target value is greater than a predetermined threshold value.

10. The control method for an electric vehicle according to claim 8, wherein the correction processing includes:
    calculating a model response of the longitudinal acceleration; and
    calculating the natural vibration frequency and the attenuation coefficient based on a difference between an acquired longitudinal acceleration and the model response of the longitudinal acceleration.

11. The control method for an electric vehicle according to claim 10, wherein the model response of the longitudinal acceleration is calculated based on the basic torque target value, a weight of the electric vehicle, and a weight of the coupled vehicle.

12. The control method for an electric vehicle according to claim 10, wherein the correction processing includes calculating the natural vibration frequency and the attenuation coefficient by performing frequency analysis processing on a difference between the acquired longitudinal acceleration and the model response of the longitudinal acceleration.

13. The control method for an electric vehicle according to claim 8, wherein the correction processing includes updating the dynamic characteristic when the dynamic characteristic changes more than a predetermined threshold value with respect to a previous value.

14. The control method for an electric vehicle according to claim 1, wherein the correction processing includes:
    calculating a natural vibration frequency and an attenuation coefficient of the longitudinal vibration component based on a longitudinal acceleration of the electric vehicle;
    correcting mechanical characteristics of the coupling portion or a weight of the electric vehicle or the coupled vehicle based on the natural vibration frequency and the attenuation coefficient;
    calculating a relative vehicle speed between the electric vehicle and the coupled vehicle based on the corrected mechanical characteristics of the coupling portion, or the corrected weight of the electric vehicle or the coupled vehicle;
    calculating a correction torque for the longitudinal vibration component based on the relative vehicle speed; and
    correcting the basic torque target value using the correction torque.

15. A control device for an electric vehicle that includes a motor as a drive source and a coupling portion coupled to another vehicle, and travels while towing a coupled vehicle, which is the other vehicle coupled to the coupling portion, the control device comprising:
    a basic torque target value calculation unit configured to calculate a basic torque target value representing a torque to be output by the motor based on a vehicle operation; and
    a correction processing unit configured to calculate a final torque command value, which is a final command value for the torque, by performing correction processing for reducing a longitudinal vibration component generated in the electric vehicle due to the coupled vehicle being coupled to the coupling portion on the basic torque target value, based on a dynamic characteristic of the coupling portion to which the coupled vehicle is coupled, wherein
the motor is controlled based on the final torque command value.

* * * * *